US009556287B2

(12) United States Patent
Giesbrecht et al.

(10) Patent No.: US 9,556,287 B2
(45) Date of Patent: Jan. 31, 2017

(54) VINYL TERMINATED MACROMONOMERS

(71) Applicant: ExxonMobil Chemical Patents Inc., Baytown, TX (US)

(72) Inventors: Garth R. Giesbrecht, The Woodlands, TX (US); Matthew W. Holtcamp, Huffman, TX (US); Gregory S. Day, Pasadena, TX (US); John R. Hagadorn, Houston, TX (US)

(73) Assignees: ExxonMobil Chemical Patents Inc., Baytown, TX (US); Ramot at Tel-Aviv University Ltd., Tel Aviv (IL)

( * ) Notice: Subject to any disclaimer, the term of this patent is extended or adjusted under 35 U.S.C. 154(b) by 0 days.

(21) Appl. No.: 14/690,146

(22) Filed: Apr. 17, 2015

(65) Prior Publication Data

US 2015/0291710 A1 Oct. 15, 2015

Related U.S. Application Data

(62) Division of application No. 14/059,081, filed on Oct. 21, 2013, now Pat. No. 9,120,879.

(60) Provisional application No. 61/722,110, filed on Nov. 2, 2012.

(51) Int. Cl.
| | |
|---|---|
| *C08F 10/02* | (2006.01) |
| *C08F 110/02* | (2006.01) |
| *C08F 210/02* | (2006.01) |
| *C08F 4/643* | (2006.01) |
| *C08F 4/76* | (2006.01) |
| *C08F 4/64* | (2006.01) |
| *C08F 4/642* | (2006.01) |
| *C08F 4/659* | (2006.01) |

(52) U.S. Cl.
CPC ............... *C08F 4/76* (2013.01); *C08F 4/642* (2013.01); *C08F 4/64189* (2013.01); *C08F 10/02* (2013.01); *C08F 4/659* (2013.01); *C08F 4/65912* (2013.01); *C08F 4/65916* (2013.01); *Y02P 20/52* (2015.11)

(58) Field of Classification Search
CPC .... C08F 4/60189; C08F 110/02; C08F 210/02
See application file for complete search history.

(56) References Cited

U.S. PATENT DOCUMENTS

| | | | |
|---|---|---|---|
| 4,066,715 A | 1/1978 | Isa et al. | |
| 5,153,157 A | 10/1992 | Hlatky et al. | |
| 5,942,459 A | 8/1999 | Sugano et al. | |
| 5,955,557 A * | 9/1999 | Machida | C08F 8/04 526/346 |
| 5,998,645 A | 12/1999 | Nestler | |
| 6,309,997 B1 | 10/2001 | Fujita et al. | |
| 6,399,724 B1 | 6/2002 | Matsui et al. | |
| 6,444,773 B1 * | 9/2002 | Markel | C08F 2/08 526/348 |
| 6,462,136 B1 | 10/2002 | Saito | |
| 6,531,555 B2 | 3/2003 | Whiteker | |
| 6,548,723 B2 | 4/2003 | Bagheri et al. | |
| 6,632,899 B2 | 10/2003 | Kol et al. | |
| 6,686,490 B1 | 2/2004 | Kol et al. | |
| 6,699,824 B1 | 3/2004 | Dawson et al. | |
| 7,105,703 B1 | 9/2006 | Atwood | |
| 7,144,839 B2 | 12/2006 | Gibson et al. | |
| 7,241,714 B2 | 7/2007 | Boussie et al. | |
| 7,300,903 B2 | 11/2007 | Fujita et al. | |
| 7,385,015 B2 | 6/2008 | Holtcamp | |
| 7,531,602 B2 | 5/2009 | Hoang et al. | |
| 7,544,749 B2 | 6/2009 | Jones et al. | |
| 7,696,123 B2 | 4/2010 | Schneider et al. | |
| 7,812,184 B2 | 10/2010 | Kondo et al. | |
| 7,880,047 B2 | 2/2011 | Knowles et al. | |
| 7,989,565 B2 | 8/2011 | Gibson et al. | |
| 7,989,670 B2 | 8/2011 | Wu et al. | |
| 8,058,373 B2 | 11/2011 | Stevens et al. | |
| 8,101,696 B2 | 1/2012 | Konze et al. | |
| 8,202,953 B2 | 6/2012 | Konze et al. | |
| 8,222,358 B2 | 7/2012 | Rodriguez et al. | |
| 8,227,392 B2 | 7/2012 | Wu et al. | |
| 8,299,189 B2 | 10/2012 | Boone et al. | |
| 8,450,438 B2 | 5/2013 | Aboelella et al. | |
| 8,907,032 B2 | 12/2014 | Kol et al. | |
| 9,464,148 B2 | 10/2016 | Giesbrecht et al. | |
| 2002/0173604 A1 | 11/2002 | Kol et al. | |
| 2003/0027955 A1 * | 2/2003 | Ishii | C08F 8/00 526/127 |
| 2003/0105250 A1 | 6/2003 | Whiteker | |
| 2004/0167016 A1 | 8/2004 | Holtcamp et al. | |
| 2005/0075242 A1 | 4/2005 | Holtcamp et al. | |
| 2005/0227860 A1 | 10/2005 | Green et al. | |

(Continued)

FOREIGN PATENT DOCUMENTS

| | | |
|---|---|---|
| CN | 101080399 | 11/2007 |
| CN | 101437827 | 5/2009 |

(Continued)

OTHER PUBLICATIONS

U.S. Appl. No. 13/921,923 Office Action dated May 16, 2014.
U.S. Appl. No. 13/921,923 Final Office Action dated Nov. 3, 2014.
U.S. Appl. No. 13/921,923 Advisory Action dated Dec. 18, 2014.
U.S. Appl. No. 13/921,923 Office Action dated Jan. 20, 2015.
U.S. Appl. No. 13/921,923 Final Office Action dated Jun. 3, 2015.
U.S. Appl. No. 13/921,923 Office Action dated Jul. 17, 2015.
U.S. Appl. No. 13/921,868 Office Action dated Jun. 9, 2014.
U.S. Appl. No. 14/406,414 Office Action dated Jul. 9, 2015.
Busico et al. "Living Ziegler-Natta Polymerization: True or False?", Macromolecules Symposium, 226: 1-16, 2005.
Busico et al. "Reactivity of Secondary Metal-Alkyls in Catalytic Propene Polymerization: How Dormant are 'Dormant Chains'?", Journal of the American Chemical Society, 127(6): 1608-1609, 2005.

(Continued)

*Primary Examiner* — Caixia Lu
(74) *Attorney, Agent, or Firm* — Daniel N. Lundeen; Lundeen & Lundeen PLLC

(57) ABSTRACT

Polymers produced by a process comprising contacting one or more olefins with a catalyst system comprising an activator and a Salan catalyst disposed on a support.

20 Claims, No Drawings

(56) References Cited

U.S. PATENT DOCUMENTS

| | | |
|---|---|---|
| 2006/0100092 A1 | 5/2006 | Jones et al. |
| 2007/0021561 A1 | 1/2007 | Tse et al. |
| 2007/0208148 A1 | 9/2007 | Rodriguez et al. |
| 2008/0108499 A1 | 5/2008 | Coates et al. |
| 2009/0005279 A1 | 1/2009 | Wu et al. |
| 2009/0036725 A1 | 2/2009 | Wu et al. |
| 2009/0043100 A1 | 2/2009 | Kondo et al. |
| 2009/0099381 A1 | 4/2009 | Katsuki et al. |
| 2009/0186995 A1 | 7/2009 | Canich et al. |
| 2009/0318640 A1 | 12/2009 | Brant et al. |
| 2009/0318644 A1 | 12/2009 | Brant et al. |
| 2010/0029871 A1 | 2/2010 | Crowther et al. |
| 2010/0081808 A1 | 4/2010 | Kondo et al. |
| 2010/0298510 A1 | 11/2010 | Crowther et al. |
| 2011/0124831 A1 | 5/2011 | Luo |
| 2011/0152497 A1 | 6/2011 | Allen et al. |
| 2011/0306740 A1 | 12/2011 | Nagy et al. |
| 2011/0319578 A1 | 12/2011 | Hanaoka et al. |
| 2012/0184676 A1 | 7/2012 | Gahleitner et al. |
| 2012/0245312 A1 | 9/2012 | Holtcamp et al. |
| 2012/0316302 A1 | 12/2012 | Stewart |
| 2013/0030135 A1 | 1/2013 | Hagadorn et al. |
| 2013/0096271 A1 | 4/2013 | Kol et al. |
| 2013/0253244 A1 | 9/2013 | Emett et al. |
| 2013/0310529 A1 | 11/2013 | Kol et al. |
| 2014/0039137 A1 | 2/2014 | Giesbrecht et al. |
| 2014/0039138 A1 | 2/2014 | Giesbrecht et al. |
| 2014/0039139 A1 | 2/2014 | Giesbrecht et al. |
| 2014/0039140 A1 | 2/2014 | Giesbrecht et al. |
| 2014/0039141 A1 | 2/2014 | Giesbrecht et al. |

FOREIGN PATENT DOCUMENTS

| | | |
|---|---|---|
| CN | 101080399 | 12/2012 |
| EP | 1849775 | 10/2007 |
| EP | 1849778 | 10/2007 |
| EP | 2003135 | 12/2008 |
| EP | 2532687 | 12/2012 |
| JP | 2007284438 | 11/2007 |
| WO | 9806727 | 2/1998 |
| WO | 0236638 | 5/2002 |
| WO | 03091292 | 11/2003 |
| WO | 2004069881 | 8/2004 |
| WO | 2007007893 | 1/2007 |
| WO | 2007075299 | 7/2007 |
| WO | 2007076231 | 7/2007 |
| WO | 2009027516 | 3/2009 |
| WO | 2011019474 | 2/2011 |
| WO | 201158241 | 12/2011 |
| WO | 2012004680 | 1/2012 |
| WO | 2012027448 | 3/2012 |
| WO | 2012098521 A1 | 7/2012 |
| WO | 2012098521A18 | 9/2012 |
| WO | 2013043796 | 3/2013 |

OTHER PUBLICATIONS

Ciancaleone et al. "Activation of A Bis(Phenoxy-Amine) Precatalyst for Olefin Polymerization: First Evidence for an Outer Sphere Ion Pair With the Methylborate Counterion", Dalton Transactions, p. 8824-8827, 2009.
Ciancaleone et al. "Stucture-Activity Relationship in Olefin Polymerization Catalysis: Is Entropy the Key?", Journal of the American Chemical Society, JACS, 132: 13651-13653, 2010.
Tshuva et al. "Single-Step Synthesis of Salans and Substituted Salans by Mannich Condensation", Tetrahedron Letters, 42: 6405-6407, 2001.
Official Action Dated Sep. 6, 2013 From the US Patent and Trademark Office Re. U.S. Appl. No. 13/805,011.
Restriction Official Action Dated May 13, 2013 From the US Patent and Trademark Office Re. U.S. Appl. No. 13/805,011.
Notice of Allowance Dated Jul. 1, 2014 From the US Patent and Trademark Office Re. U.S. Appl. No. 13/805,011.
Communication Pursuant to Article 94(3) EPC Dated Mar. 14, 2014 From the European Patent Office Re. U.S. Appl. No. 11736169.1.
Communication Relating to the Results of the Partial International Search Dated Apr. 19, 2012 From the International Searching Authority Re. Application No. PCT/IB2012/050267.
Corrected International Search Report and the Written Opinion Dated Sep. 25, 2012 From the International Searching Authority Re. Application No. PCT/IB2012/050267.
International Search Report and the Written Opinion Dated Jun. 19, 2012 From the International Searching Authority Re. Application No. PCT/IB2012/050267.
Office Action Dated Jul. 28, 2014 From the State Intellectual Property Office of the People's Republic of China Re. Application No. 201180039237.5.
Search Report Dated Jul. 28, 2014 From the State Intellectual Property Office of the People's Republic of China Re. Application No. 201180039237.5.
International Preliminary Report and the Written Opinion on Patentability Dated Jan. 3, 2013 From the International Bureau of WIPO Re. Application No. PCT/IL2011/000482.
International Search Report Dated Dec. 5, 2011 From the International Searching Authority Re. Application No. PCT/IL2011/000482.
International Preliminary Report and Written Opinion on Patentability Dated Jul. 23, 2013 From the International Bureau of WIPO Re. Application No. PCT/IB2012/050267.
Office Action Dated Jul. 28, 2014 From the State Intellectual Property Office of the People's Republic of China Re. Application No. 201180039237.5 Translation Into English.
U.S. Appl. No. 13/921,532, Final Office Action dated Sep. 5, 2014.
U.S. Appl. No. 13/921,532, Non-Final Office Action dated May 20, 2014.
U.S. Appl. No. 13/921,709, Final Office Action dated Sep. 9, 2014.
U.S. Appl. No. 13/921,709, Non-Final Office Action dated May 16, 2014.
U.S. Appl. No. 13/921,761, Final Office Action dated Oct. 27, 2014.
U.S. Appl. No. 13/921,761, Non-Final Office Action dated May 16, 2014.
U.S. Appl. No. 13/921,868, Non-Final Office Action dated Sep. 9, 2014.
U.S. Appl. No. 13/921,923, Final Office Action dated Nov. 3, 2014.
U.S. Appl. No. 13/921,923, Non-Final Office Action dated May 16, 2014.
PCT/IL2011/000482 International Search Report and Written Opinion, Jan. 13, 2013
Berkessel, Albrecht et al., Ligands: Highly Enantioselective Titanium In Situ Catalysts for Asymmetric Epoxidation with Aqueous Hydrogen Peroxide, Adv. Synth Catal, 2007, vol. 349, pp. 2385-2391.
Whitelaw, Emma L. et al., Group 4 Salalen Complexes and Their Application for the Ring-Opening Polymerization of rac-Lactide, Inorg. Chem., 2010, vol. 49, pp. 7176-7181.
PCT/US2013/69419 International Search Report and Written Opinion, Mar. 7, 2014
PCT/US2013/46569 International Search Report and Written Opinion, Jun. 13, 2014.
PCT/US2014/041362-ISR and WO, Oct. 1, 2014.
PCT/US2014/039786-ISR and WO, Sep. 29, 2014.
PCT/US2014/039766-ISR and WO, Oct. 31, 2014.
Immel et al., Cytotoxic dinuclear titanium-salan complexes: Structural and biological characterization, Journal of Inorganic Biochemistry, 2012, vol. 106, pp. 68-75.
PCT/US2013/046615 International Search Report and Written Opinion, Nov. 13, 2013.
PCT/US2013/053363 International Search Report and Written Opinion, Dec. 20, 2013.
Sanz, Martial et al., Monocyclopentadienyl Bis (phenoxo-imino) Zirconium Complexes as Precatalyst Species for Olefin Polymerization. Stereospecific Methylation of an Imino Group with Formation of a Zirconium-amido Bond; 2004 Organometallics, vol. 23, pp. 5324-5331.

(56) References Cited

OTHER PUBLICATIONS

Plass "Synthese, Struktur and Oxotransferreaktionen von Dioxomolybdan (VI)—Komplexen mit mehrzahnigen Aminoalkoholen als Liganden", Z. anorg. allg. Chem., 623 (1997) 997-1005.
Rajendiran et al., "Cleavage of Proteins by a Mixed-Ligand Copper (II) Phenolate Complex: Hydrophobicity of the Diimine Coligand Promotes Cleavage", Inorg. Chem., 2007, 46: 10446-10448.
Allard et al., "Sequential Phenolate Oxidations in Octahedral Cobalt (III) Complexes with [N1O3] Ligands", European Journal of Inorganic Chemistry 2012, 29: 4622-4631.
Arredondo, Yolanda et al., Non-Catalyzed C-Alkylation of Phenols with Cyclic Secondary Alkyl Bromies, Synthetic Communications, 1996, vol. 26, No. 21, pp. 3885-3895.
Bryliakov, K. et al, Titanium-Salan-Catalyzed Asymmetric Oxidation of Sulfides and Kinetic Resolution of Sulfoxides with H2O2 as the Oxidant, Eur. J. Org. Chem., 2008, pp. 3369-3376.
Busico, Vincenzo et al, New Evidence on the Nature of the Active Sites in Heterogeneous Ziegler-Natta Catalysts for Propene Polymerization, 1997, Macromolecules, vol. 30, pp. 4786-4790.
Busico, Vincenzo et al., Mimicking Ziegler-Natta Catalysts in Homogeneous Phase, 1 C2-Symmetric Octahedral Zr (IV) Complexes with Tetradentate [ONNO]-Type Ligands, Macromol. Rapid Commun. 2001, vol. 22, No. 17, pp. 1405-1409.
Busico, Vincenzo et al., The first Molecularly Characterized Isotactic Polypropylene-block-polyethylene Obtained via "Quasi-Living" Insertion Polymerization, Macromolecules, 2003, vol. 36, No. 11, pp. 3806-3808.
Busico, Vincenzo et al., Block Copolymers of Highly Isotactic Polypropylene via Controlled Ziegler-Natta Polymerization, Macromolecules, 2004, vol. 37, No. 22, pp. 8201-8203.
Busico, Vincenzo et al., Design of stereoselective Ziegler-Natta propene polymerization catalysts, PNAS, 2006, vol. 103, No. 42, pp. 15321-15326.
Ciancaleoni, Gianluca et al., Structure/Properties Relationship for Bis{phenoxyamine)Zr(IV)-Based Olefin Polymerization Catalysts: A Simple OFT Model to Predict Catalytic Activity, Macromolecules, 2012, vol. 45, pp. 4046-4053.
Cipullo, Roberta et al., Improving the Behavior of Bis(phenoxyamine) Group 4 Metal Catalysts for Controlled Alkene Polymerization, 2009, Macromolecules, vol. 42, pp. 3869-3872.
Clarkson, Guy et al., Group 4 catalysts for ethene polymerization containing tetradentate salicylaldiminato ligands, 2006, Dalton Trans., pp. 5484-5491.
Cohen, Ad et al., Construction of C1-symmetric zirconium complexes by the design of new Salan ligands. Coordination chemistry and preliminary polymerisation catalysis studies, Chem. Commun, 2008, pp. 2149-2151.
Cohen, Ad et al., C1-Symmetric Zirconium Complexes of [ONNO#]-Type Salan Ligands: Accurate Control of Catalyst Activity, Isospecificity, and Molecular Weight in 1-Hexene Polymerization, Organometallics, 2009, vol. 28, No. 5, pp. 1391-1405.
Cohen, Ad et al., Same Ligand, Different Metals: Diiodo-Salan Complexes of the Group 4 Triad in Isospecific Polymerization of 1-Hexene and Propylene, Macromolecules, 2010, vol. 43, No. 4, pp. 1689-1691.
Corradini, Paolo et al., Do New Century Catalysts Unravel the Mechanism of Stereocontrol of Old Ziegler-Natta Catalysts?, Accounts of Chemical Research, 2004, vol. 37, No. 4, pp. 231-241.
Demetgul, Cahit et al., Synthesis and characterization of a Schiff base derived from 2-aminobenzylamine and its Cu(II) complex: electropolymerization of the complex on a platinum electrode, Journal of Coordination Chemistry, 2010, vol. 63, No. 12, pp. 2181-2191.
Egami, Hiromichi et al., Fe(salan)-Catalyzed Asymmetric Oxidation of Sulfides with Hydrogen Peroxide in Water, 2007, J. Am. Chem. Soc., vol. 129, pp. 8940-8941.
Egami, Hiromichi et al., Nb(salan)-Catalyzed Asymmetric Epoxidation of Allylic Alcohols with Hydrogen Peroxide, 2008, J. Am. Chem. Soc., vol. 47, pp. 5171-5174.

Egami, Hiromichi et al., Oxidation Catalysis of Nb(Salan) Complexes: Asymmetric Epoxidation of Allylic Alcohols Using Aqueous Hydrogen Peroxide as an Oxidant, 2010, J. Am. Chem. Soc., vol. 132, pp. 5886-5895.
Egami, Hiromichi et al., Enantioenriched Synthesis of C1-Symmetric BINOLs: Iron-Catalyzed Cross-Coupling of 2-Naphthols and Some Mechanistic Insight, 2010, J. Am. Chem. Soc., vol. 132, pp. 13633-13635.
Gendler, Shimrit, et al., Titanium and Zirconium Complexes of Robust Salophan Ligands. Coordination Chemistry and Olefin Polymerization Catalysis, J. Am. Chem. Soc., 2008, vol. 130, pp. 2144-2145.
Groysman, Stanislav et al., Salophan Complexes of Group IV Metals, Eur. J. Inorg. Chem. 2005, pp. 2480-2485.
Kondo, Shoichi et al., A μ-Oxo-μ-η2 :η2-Peroxo Titanium Complex as a Reservoir of Active Species in Asymmetric Epoxidation Using Hydrogen Peroxide, 2008, Agnew. Chem. Int. Ed., vol. 47, pp. 10195-10198.
Lamberti, Marina et al., Mechanism of stereospecific polymerization of α-olefins by late-transition metal and octahedral group 4 metal catalysts, Coord. Chem. Rev. vol. 253, 2009, pp. 2082-2097.
Leflon, P. et al., Determination of aluminum in bone in haemodialyzed patients, using inductively coupled argon plasma emission spectrometry, Clinica Chimica Acta, 1990, vol. 191, issues 1-2, pp. 31-38.
Manna, Cesar M. et al., Markedly different cytotoxicity of the two enantiomers of C2-symmetrical Ti(IV) phenolato complexes; mechanistic implications, 2010, Dalton Trans., vol. 39, pp. 1182-1184.
Matsumoto, Kazuhiro et al., Asymmetric catalysis of metal complexes with non-planar ONNO ligands: salen, salalen and salan, Chem. Commun., 2007, pp. 3619-3627.
Matsumoto, Kazuhiro et al., Asymmetric epoxidation of olefins catalyzed by Ti(salan) complexes using aqueous hydrogen peroxide as the oxidant, 2008, Pure and Applied Chemistry, vol. 80, pp. 1071-1077.
Matsumoto, Kazuhiro et al., Highly Enantioselective Epoxidation of Styrenes Catalyzed by Proline-Derived C1-Symmetric Titanium(Salan) Complexes, Angew. Chem. Int. Ed. 2009, vol. 48, pp. 7432-7435.
Meker, Sigalit. et al., Major impact of N-methylation on cytotoxicity and hydrolysis of salan Ti(IV) complexes: sterics and electronics are intertwined, 2011, Dalton Trans., vol. 40, pp. 9802-9809.
Nakano, Koji et al., Alternating Copolymerization of Cyclohexene Oxide with Carbon Dioxide Catalyzed by (salalen) CrCl Complexes, Macromelecules, 2009, vol. 42, pp. 6972-6980.
Press, Konstantin et al., Salalen Titanium Complexes in the Highly Isospecific Polymerization of 1-Hexene and Propylene, Angew. Chem., Int. Ed., 2011, vol. 50, pp. 3529-3532.
Press, Konstantin et al., Zirconium and hafnium Salalen complexes in isospecific polymerisation of propylene, Dalton Trans., 2013, vol. 42, pp. 9096-9103.
Sawada, Yuji, et al., Titanium-Salan-Catalyzed Asymmetric Epoxidation with Aqueous Hydrogen Peroxide as the Oxidant, Agnew. Chem. Int. Ed., 2006, vol. 45, pp. 3478-3480.
Segal, Sharon et al., Isospecific Polymerization of Vinylcyclohexane by Zirconium Complexes of Salan Ligands, Macromolecules, 2008, vol. 41, No. 5, pp. 1612-1617.
Segal, Sharon et al., Zirconium and Titanium Diamine Bis(phenolate) Catalysts for α-Olefin Polymerization: From Atactic Oligo(1-hexene) to Ultrahigh-Molecular-Weight Isotactic Poly(1-hexene), Organomellics, 2005, vol. 24, No. 2, pp. 200-202.
Sergeeva, Ekaterina et al., Salan ligands assembled around chiral bipyrrolidine: predetermination of chirality around octahedral Ti and Zr centres, Chem. Commun, 2009, pp. 3053-3055.
Sergeeva, Ekaterina et al., 2,2'-Bipyrrolidine versus 1,2-Diaminocyclohexane as Chiral Cores for Helically Wrapping Diamine-Diolate Ligands, Inorganic Chemistry, 2009, vol. 48, No. 17, pp. 8075-8077.
Seyforth, Dietmar, Alkyl and Aryl Derivatives of the Alkali Metals: Strong Bases and Reactive Nucleophiles. 2. Wilhelm Schlenk's Organoalkali-Metal Chemistry. The Metal Displacement and the

(56) References Cited

OTHER PUBLICATIONS

Transmetalation Reactions. Metalation of Weakly Acidic Hydrocarbons. Superbases, Organometallics, 2009, vol. 28, pp. 2-33.
Stopper, Ayellet et al., Ring-Opening Polymerization of Lactide with Zr Complexes of {ONSO} Ligands: From Heterotactically Inclined to Isotactically Inclined Poly(lactic acid), Macromelecules, 2012, vol. 45, pp. 698-704.
Strianese M., et al., A Comparative Study on the Polymerization of α-Olefins Catalyzed by Salen and Salan Zirconium ComplexesMacromol. Chem. Phys. 2008, vol. 209, pp. 585-592.
Talarico, Giovanni et al., Origin of the Regiochemistry of Propene Insertion at Octahedral col. 4 Polymerization Catalysts: Design or Serendipity?, J. Am. Chem. Soc., 2003, vol. 125, pp. 7172-7173.
Tshuva, Edit Y. et al., Isospecific Living Polymerization of 1-Hexene by a Readily Available Nonmetallocene C2-Symmetrical Zirconium Catalyst, J. Am. Chem. Soc., 2000, vol. 122, pp. 10706-10707.
Yeori et al., Salalen: a hybrid Salan/Salen tetradentate [ONNO]-type ligand and its coordination behavior with group IV metals, Inorg. Chem. Commun., vol. 7, 2004, pp. 280-282.
Yeori, Adi et al., Diastereoisomerically Selective Enantiomerically Pure Titanium Complexes of Salan Ligands: Synthesis, Structure, and Preliminary Activity Studies, Inorganic Chemistry, 2005, vol. 44, No. 13, pp. 4466-4468.
Yeori, Adi et al., Diastereomerically-Specific Zirconium Complexes of Chiral Salan Ligands: Isospecific Polymerization of 1-Hexene and 4-Methyl-1-pentene and Cyclopolymerization of 1,5-Hexadiene, J . Am. Chem. Soc, 2006, vol. 128, pp. 13062-13063.
Yeori, Adi et al., Cyclopolymerization of 1,5-Hexadiene by Enantiomerically-Pure Zirconium Salan Complexes. Polymer Optical Activity Reveals α-Olefin Face Preference, Macromolecules, 2007, vol. 40, No. 24, pp. 8521-8523.
Zucchini, U. et al., Synthesis and Properties of Some Titanium and Zirconium Benzyl Derivatives, J. Organomet. Chem., 1971, vol. 26, pp. 357-372.
PCT/US2013/046538 International Search Report and Written Opinion, Nov. 8, 2013.
PCT/US2013/046582 International Search Report and Written Opinion, Nov. 5, 2013.
PCT/US2013/046601 International Search Report and Written Opinion, Nov. 13, 2013.

* cited by examiner

VINYL TERMINATED MACROMONOMERS

RELATED APPLICATIONS

This application is a divisional application of U.S. Ser. No. 14/059,081, filed Oct. 21, 2013, which claims priority to and the benefit of provisional application U.S. 61/722,110, filed Nov. 2, 2012, and which is hereby incorporated herein by reference.

NAMES OF PARTIES TO JOINT RESEARCH AGREEMENT (1) ExxonMobil Chemical Company, a division of ExxonMobil Corporation; (2) Ramot at Tel Aviv University Ltd.

FIELD OF THE INVENTION

This invention relates to supported Salan catalysts, processes utilizing such catalysts, and polymers produced thereby.

BACKGROUND OF THE INVENTION

Supported olefin polymerization catalysts are of great use in industry. Hence there is interest in finding new supported catalyst systems that increase the commercial usefulness of the catalyst and allow the production of polymers having improved properties.

There is a need in the art for new and improved supported catalysts and catalyst systems to obtain new and improved polyolefins, polymerization processes, and the like. Accordingly, there is a need in the art for new and improved supported catalyst systems for the polymerization of olefins, in order to achieve specific polymer properties such as vinyl termination.

SUMMARY OF THE INVENTION

The instant disclosure is directed to supported catalyst compounds, supported activators, and catalyst systems comprising such compounds, processes for the preparation of the catalyst compounds and systems, and processes for the polymerization of olefins using such supported catalyst compounds and systems.

In an embodiment according to the invention, a process comprises contacting one or more olefins with a catalyst system at a temperature, a pressure, and for a period of time sufficient to produce a polyolefin; the catalyst system comprising an activator and a catalyst compound disposed on a support, according to Formula I, Formula II, Formula III, or a combination thereof:

Formula I being represented by:

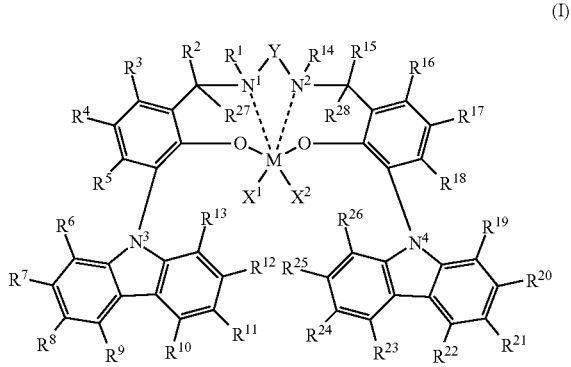

(I)

wherein each solid line represents a covalent bond and each dashed line represents a bond having varying degrees of covalency and a varying degree of coordination;

wherein M is a Group 3, 4, 5 or 6 transition metal;
$N^1$, $N^2$, $N^3$ and $N^4$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof; and
Y is a divalent $C_1$ to $C_{20}$ hydrocarbyl radical;
Formula II being represented by:

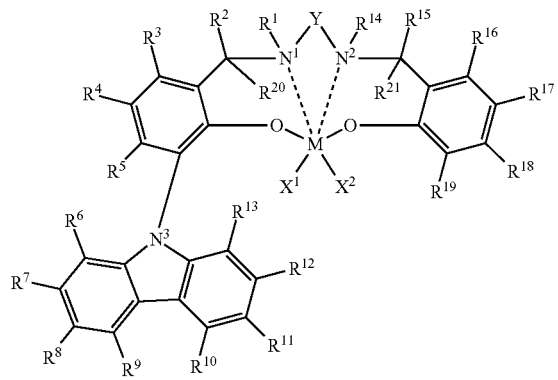

(II)

wherein each solid line represents a covalent bond and each dashed line represents a bond having varying degrees of covalency and a varying degree of coordination;
wherein M is a Group 3, 4, 5 or 6 transition metal;
$N^1$, $N^2$, and $N^3$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and Y is a divalent $C_1$ to $C_{20}$ hydrocarbyl radical;

Formula III being represented by:

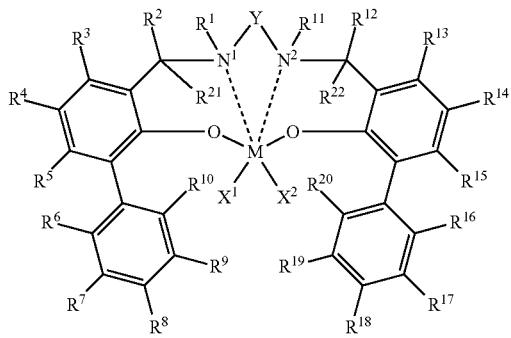

(III)

wherein each solid line represents a covalent bond and each dashed line represents a bond having varying degrees of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof;
at least one of $R^6$, $R^7$, $R^8$, $R^9$, $R^{10}$, $R^{16}$, $R^{17}$, $R^{18}$, $R^{19}$, or $R^{20}$ comprise fluorine; and
Y is a divalent $C_1$ to $C_{20}$ hydrocarbyl radical.

In an embodiment according to the invention, a polyolefin comprises at least 50 mol % ethylene, the polymer produced by a process comprising:
contacting one or more olefins with a catalyst system at a temperature, a pressure, and for a period of time sufficient to produce a polyolefin, the catalyst system comprising an activator and a catalyst compound disposed on a support; wherein the catalyst compound is according to Formula I, Formula II, Formula III, or a combination thereof:
Formula I being represented by:

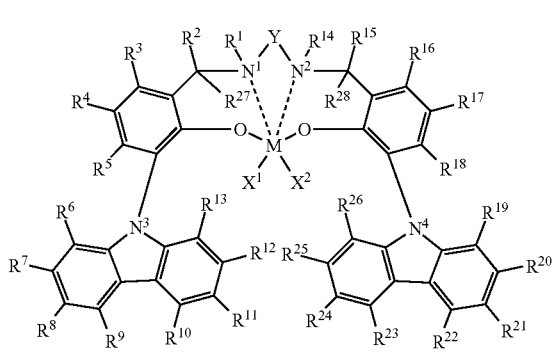

(I)

wherein each solid line represents a covalent bond and each dashed line represents a bond having varying degrees of covalency and a varying degree of coordination;
wherein M is a Group 3, 4, 5 or 6 transition metal;
$N^1$, $N^2$, $N^3$ and $N^4$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and
Y is a divalent $C_1$ to $C_{20}$ hydrocarbyl radical;
Formula II being represented by:

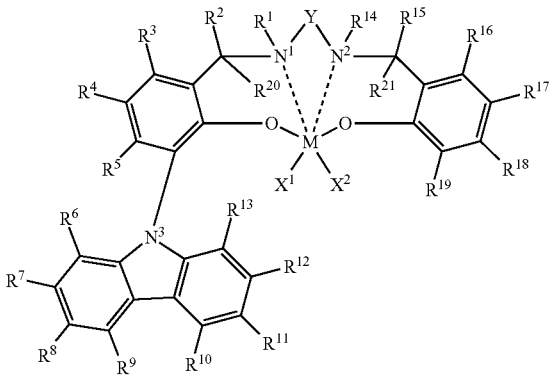

(II)

wherein each solid line represents a covalent bond and each dashed line represents a bond having varying degrees of covalency and a varying degree of coordination;
wherein M is a Group 3, 4, 5 or 6 transition metal;
$N^1$, $N^2$, and $N^3$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical; and
Y is a divalent $C_1$ to $C_{20}$ hydrocarbyl radical;

Formula III being represented by:

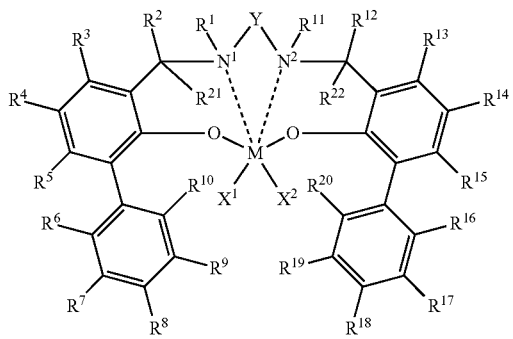

(III)

wherein each solid line represents a covalent bond and each dashed line represents a bond having varying degrees of covalency and a varying degree of coordination;
wherein M is a Group 3, 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof;
at least one of $R^6$, $R^7$, $R^8$, $R^9$, $R^{10}$, $R^{16}$, $R^{17}$, $R^{18}$, $R^{19}$, or $R^{20}$ comprise fluorine; and
Y is a divalent $C_1$ to $C_{20}$ hydrocarbyl radical.

DETAILED DESCRIPTION

For the purposes of this invention and the claims thereto, the new numbering scheme for the Periodic Table Groups is used as in Chem. Eng. News, 1985, 63, 27. Therefore, a "Group 4 metal" is an element from Group 4 of the Periodic Table.

In the structures depicted throughout this specification and the claims, a solid line indicates a bond, an arrow indicates that the bond may be dative, and each dashed line represents a bond having varying degrees of covalency and a varying degree of coordination.

The terms "hydrocarbyl radical," "hydrocarbyl" and "hydrocarbyl group" are used interchangeably throughout this document unless otherwise specified. For purposes of this disclosure, a hydrocarbyl radical is defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic where appropriate (aromatic or non-aromatic); and includes hydrocarbyl radicals substituted with other hydrocarbyl radicals and/or one or more functional groups comprising elements from Groups 13-17 of the periodic table of the elements. In addition two or more such hydrocarbyl radicals may together form a fused ring system, including partially or fully hydrogenated fused ring systems, which may include heterocyclic radicals.

For purposes herein, a carbazole or substituted carbazole radical is represented by the formula:

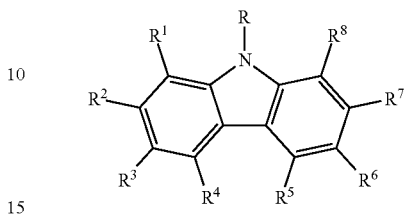

wherein each $R^1$ through $R^8$ is, independently, a hydrogen, a $C_1$-$C_{40}$ hydrocarbyl radical, a functional group comprising elements from Group 13-17 of the periodic table of the elements, or two or more of $R^1$ to $R^8$ may independently join together to form a $C_4$ to $C_{62}$ cyclic or polycyclic ring structure, or a combination thereof.

The term "substituted" means that a hydrogen atom and/or a carbon atom in the base structure has been replaced with a hydrocarbyl radical, and/or a functional group, and/or a heteroatom or a heteroatom containing group. Accordingly, the term hydrocarbyl radical includes heteroatom containing groups. For purposes herein, a heteroatom is defined as any atom other than carbon and hydrogen. For example, methyl cyclopentadiene (Cp) is a Cp group, which is the base structure, substituted with a methyl radical, which may also be referred to as a methyl functional group, ethyl alcohol is an ethyl group, which is the base structure, substituted with an —OH functional group, and pyridine is a phenyl group having a carbon in the base structure of the benzene ring substituted with a nitrogen atom.

For purposes herein, a hydrocarbyl radical may be independently selected from substituted or unsubstituted methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

For purposes herein, hydrocarbyl radicals may also include isomers of saturated, partially unsaturated and aromatic cyclic structures wherein the radical may additionally be subjected to the types of substitutions described above. The term "aryl", "aryl radical", and/or "aryl group" refers to aromatic cyclic structures, which may be substituted with hydrocarbyl radicals and/or functional groups as defined herein. Examples of aryl radicals include: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

It is to be understood that for purposes herein, when a radical is listed, it indicates that the base structure of the radical (the radical type) and all other radicals formed when that radical is subjected to the substitutions defined above. Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and nevopentyl (and analogous substituted cyclobutyls and cyclopropyls); butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

Likewise the terms "functional group", "group" and "substituent" are also used interchangeably throughout this document unless otherwise specified. For purposes herein, a functional group includes both organic and inorganic radicals or moieties comprising elements from Groups 13, 14, 15, 16, and 17 of the periodic table of elements. Suitable functional groups may include hydrocarbyl radicals, e.g., alkyl radicals, alkene radicals, aryl radicals, and/or halogen (Cl, Br, I, F), O, S, Se, Te, $NR^*_x$, $OR^*$, $SeR^*$, $TeR^*$, $PR^*_x$, $AsR^*_x$, $SbR^*_x$, $SR^*$, $BR^*_x$, $SiR^*_x$, $GeR^*_x$, $SnR^*_x$, $PbR^*_x$, and/or the like, wherein R is a $C_1$ to $C_{20}$ hydrocarbyl as defined above and wherein x is the appropriate integer to provide an electron neutral moiety. Other examples of functional groups include those typically referred to as amines, imides, amides, ethers, alcohols (hydroxides), sulfides, sulfates, phosphides, halides, phosphonates, alkoxides, esters, carboxylates, aldehydes, and the like.

For purposes herein, a supported catalyst and/or activator refers to a catalyst compound, an activator, or a combination thereof located on, in or in communication with a support wherein the activator, the catalyst compound, or a combination thereof are deposited on, vaporized with, bonded to, incorporated within, adsorbed or absorbed in, adsorbed or absorbed on, the support.

Where reference is made herein to two substituents joining together to form a cyclic or polycyclic ring structure, one substituent is directly bridged to another substituent when the two substituents together form only a covalent bond containing no atoms, i.e., the substituents are not directly bridged if they together comprise a bridge of at least one atom.

For purposes herein an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such as an Mn of less than 25,000 g/mol, or in an embodiment according to the invention, less than 2,500 g/mol, or a low number of mer units, such as 75 mer units or less. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For the purposes of this disclosure, the term "α-olefin" includes $C_2$-$C_{22}$ olefins. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane. Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst", "catalyst compound", and "transition metal compound" are defined to mean a compound capable of initiating polymerization catalysis under the appropriate conditions. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is combination of at least one catalyst compound, at least one activator, an optional co-activator, and an optional support material, where the system can polymerize monomers to polymer. For the purposes of this invention and the claims thereto, when catalyst systems are described as comprising neutral stable forms of the components it is well understood by one of ordinary skill in the art that the ionic form of the component is the form that reacts with the monomers to produce polymers.

For purposes herein the term "catalyst productivity" is a measure of how many grams of polymer (P) are produced using a polymerization catalyst comprising W grams of catalyst (cat), over a period of time of T hours; and may be expressed by the following formula: P/(T×W) and expressed in units of gPgcat$^{-1}$hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kg P/mol cat).

An "anionic ligand" is a negatively charged ligand which donates one or more pairs of electrons to a metal ion. A "neutral donor ligand" is a neutrally charged ligand which donates one or more pairs of electrons to a metal ion.

A scavenger is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In an embodiment according to the invention, a co-activator can be pre-mixed with the catalyst compound to form an alkylated catalyst compound.

A propylene polymer is a polymer having at least 50 mol % of propylene. As used herein, Mn is number average molecular weight as determined by proton nuclear magnetic resonance spectroscopy ($^1$H NMR) unless stated otherwise, Mw is weight average molecular weight determined by gel permeation chromatography (GPC), and Mz is z average molecular weight determined by GPC, wt % is weight percent, and mol % is mole percent. In the alternative, Mw and Mn may be determined by gas chromatography (GC) for polymers having a kinematic viscosity at 100° C. as determined according to ASTM D445 (KV100) less than 10 cSt, and by GPC for KV100 of 10 cSt or higher. Molecular weight distribution (MWD) is defined to be Mw divided by Mn. Unless otherwise noted, all molecular weight units, e.g., Mw, Mn, Mz, are g/mol.

The following abbreviations may be used through this specification: Me is methyl, Ph is phenyl, Et is ethyl, Pr is propyl, iPr is isopropyl, n-Pr is normal propyl, Bu is butyl, iso-butyl is isobutyl, sec-butyl refers to secondary butyl, tert-butyl, refers to tertiary butyl, n-butyl is normal butyl, pMe is para-methyl, Bn is benzyl, THF is tetrahydrofuran, Mes is mesityl, also known as 1,3,5-trimethylbenzene, Tol is toluene, TMS is trimethylsilyl, TIBAL is triisobutylaluminum, TNOAL is triisobutyl n-octylaluminum, MAO is methylalumoxane, MOMO is methoxymethoxy (also referred to as methoxymethyl ether), N is nitrogen (including that $N^1$, $N^2$, $N^3$ and $N^4$ are nitrogen) and O is oxygen.

For purposes herein, RT is room temperature, which is defined as 25° C. unless otherwise specified. All percentages are weight percent (wt %) unless otherwise specified.

In the description herein, the Salan catalyst may be described as a catalyst precursor, a pre-catalyst compound, Salan catalyst compound or a transition metal compound, and these terms are used interchangeably.

Catalyst Compounds

In an embodiment according to the invention, the catalyst comprises Group 3, 4, 5 and/or 6 disubstituted compounds supported by a tetradentate di-anionic Salan ligand, useful to polymerize olefins and/or α-olefins to produce polyolefins and/or poly(α-olefins). In an embodiment according to the invention, the catalyst compounds are represented by the following structure:

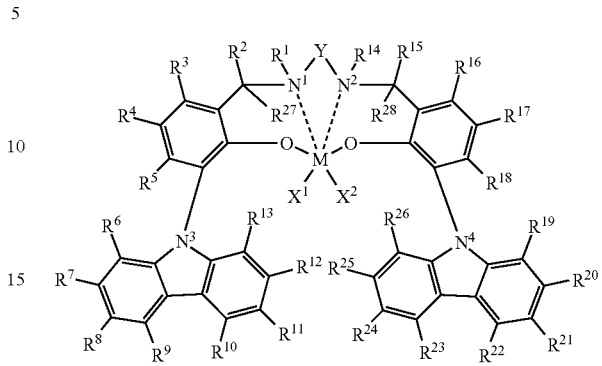

wherein each solid line represents a covalent bond and each dashed line represents a bond having varying degrees of covalency and a varying degree of coordination;

$N^1$, $N^2$, $N^3$ and $N^4$ are nitrogen;

O is oxygen;

M is a Group 3, 4, 5 or 6 transition metal covalently bonded to each oxygen atom, and bonded with varying degrees of covalency and coordination to each of nitrogen atoms $N^1$ and $N^2$;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is, independently, a hydrogen, a $C_1$-$C_{40}$ hydrocarbyl, a functional group comprising elements from Group 13-17 of the periodic table of the elements, or two or more of $R^1$ to $R^{28}$ may independently join together to form a $C_4$ to $C_{62}$ cyclic or polycyclic ring structure, or a combination thereof; and Y is a divalent hydrocarbyl radical covalently bonded to and bridging between both of the nitrogen atoms $N^1$ and $N^2$. In an embodiment according to the invention, two or more of $R^1$ to $R^{28}$ may independently join together to form a $C_4$ to $C_{62}$ cyclic or polycyclic ring structure.

In an embodiment according to the invention, the catalyst compound is represented by the formula:

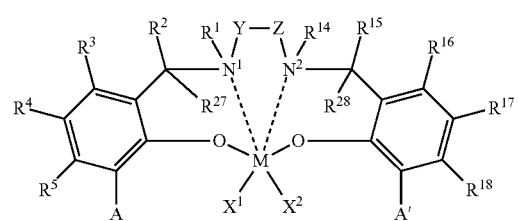

wherein A is represented by the formula, attached to the nitrogen atom, labeled $N^3$ of the carbazole ring:

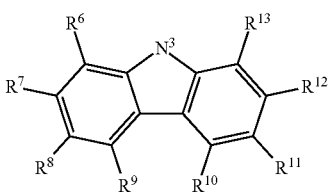

wherein A' is represented by the formula, attached to the nitrogen atom labeled $N^4$ of the carbazole ring:

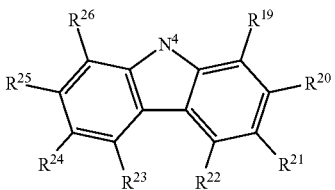

wherein M is a Group 3, 4, 5 or 6 transition metal;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Group 13-17 of the periodic table of the elements, or two or more of $R^1$ to $R^{28}$ may independently join together to form a $C_4$ to $C_{62}$ cyclic or polycyclic ring structure, or a combination thereof; and Y and Z form a divalent $C_1$ to $C_{20}$ hydrocarbyl radical. In an embodiment according to the invention, Y and Z are identical. In an embodiment according to the invention, Y and Z are different.

In an embodiment according to the invention, M is a Group 4 metal, or M is Hf, Ti and/or Zr, or M is Hf or Zr. In an embodiment according to the invention, each of $X^1$ and $X^2$ is independently selected from the group consisting of hydrocarbyl radicals having from 1 to 20 carbon atoms, hydrides, amides, and alkoxides having from 1 to 20 carbon atoms, sulfides, phosphides, halides, amines, phosphines, ethers, and combinations thereof.

In an embodiment according to the invention, $X^1$ and $X^2$ together form a part of a fused ring or a ring system having from 4 to 62 carbon atoms.

In an embodiment according to the invention, each of $X^1$ and $X^2$ is independently selected from the group consisting of halides, alkyl radicals having from 1 to 7 carbon atoms, benzyl radicals, or a combination thereof.

In an embodiment according to the invention, Y is a divalent $C_1$-$C_{40}$ hydrocarbyl radical comprising a portion that comprises a linker backbone comprising from 1 to 18 carbon atoms linking or bridging between nitrogen atoms $N^1$ and $N^2$. In an embodiment according to the invention, Y is a $C_1$-$C_{40}$ hydrocarbyl radical comprising a portion that comprises a linker backbone comprising from 1 to 18 carbon atoms linking the nitrogen atoms $N^1$ and $N^2$ wherein the hydrocarbyl comprises O, S, S(O), S(O)$_2$, Si(R*)$_2$, P(R*), N or N(R*), wherein each R* is independently a $C_1$-$C_{18}$ hydrocarbyl. In an embodiment according to the invention, Y is selected from the group consisting of ethylene (—CH$_2$CH$_2$—) and 1,2-cyclohexylene, and/or —CH$_2$CH$_2$CH$_2$— derived from propylene. In an embodiment according to the invention, Y is —CH$_2$CH$_2$CH$_2$— derived from propylene.

In an embodiment according to the invention, each of $X^1$ and $X^2$ is, independently, a halogen or a $C_1$ to $C_7$ hydrocarbyl radical.

In an embodiment according to the invention, each of $X^1$ and $X^2$ is a benzyl radical. In an embodiment according to the invention, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, hydrogen, a halogen, or a $C_1$ to $C_{30}$ hydrocarbyl radical, or a $C_1$ to $C_{10}$ hydrocarbyl radical. In an embodiment according to the invention, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is a methyl radical, a fluoride, or a combination thereof.

In an embodiment according to the invention, M is Zr; $X^1$ and $X^2$ are benzyl radicals; $R^1$ and $R^{14}$ are methyl radicals; $R^2$ through $R^{13}$ and $R^{15}$ through $R^{28}$ are hydrogen; and Y is ethylene (—CH$_2$CH$_2$—).

In an embodiment according to the invention, M is Zr; $X^1$ and $X^2$ are benzyl radicals; $R^1$, $R^4$, $R^{14}$ and $R^{17}$ are methyl radicals; $R^2$, $R^3$, $R^5$ through $R^{13}$, $R^{15}$, $R^{16}$ and $R^{18}$ through $R^{28}$ are hydrogen; and Y is ethylene (—CH$_2$CH$_2$—).

In an embodiment according to the invention, M is Zr; $X^1$ and $X^2$ are benzyl radicals; $R^1$ and $R^{14}$ are methyl radicals; $R^4$ and $R^{17}$ are fluoro (F) functional groups; $R^2$, $R^3$, $R^5$ through $R^{13}$, $R^{15}$, $R^{16}$ and $R^{18}$ through $R^{28}$ are hydrogen; and Y is ethylene —CH$_2$CH$_2$—).

In an embodiment according to the invention, M is Zr; $X^1$ and $X^2$ are benzyl radicals; $R^1$, $R^4$, $R^{14}$, and $R^{17}$ are methyl radicals; $R^8$, $R^{11}$, $R^{21}$, and $R^{24}$ are tert-butyl radicals; $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$, $R^{26}$, $R^{27}$, and $R^{28}$ are hydrogen; and Y is ethylene (—CH$_2$CH$_2$—).

In an embodiment according to the invention, M is Zr; $X^1$ and $X^2$ are benzyl radicals; $R^1$, $R^4$, $R^{14}$ and $R^{17}$ are methyl radicals; $R^8$, $R^{11}$, $R^{21}$ and $R^{24}$ are mesityl radicals; $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$, $R^{26}$, $R^{27}$, and $R^{28}$ are hydrogen; and Y is ethylene (—CH$_2$CH$_2$—).

In an embodiment according to the invention, the catalyst comprises Group 3, 4, 5 and/or 6 disubstituted compounds supported by a tetradentate di-anionic Salan ligand, useful to polymerize olefins and/or α-olefins to produce polyolefins and/or poly(α-olefins). In an embodiment according to the invention, the catalyst compounds are represented by the following structure:

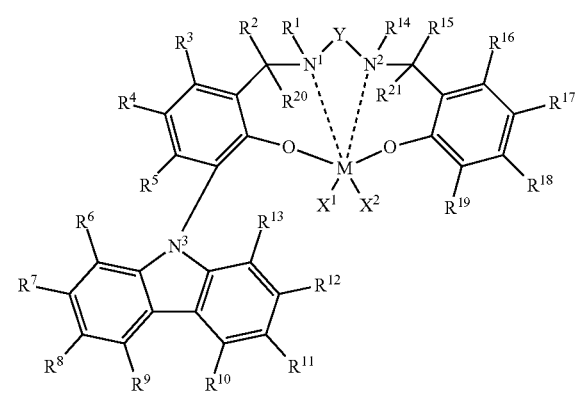

wherein each solid line represents a covalent bond and each dashed line represents a bond having varying degrees of covalency and a varying degree of coordination;

$N^1$, $N^2$, and $N^3$ are nitrogen;

O is oxygen;

M is a Group 3, 4, 5 or 6 transition metal covalently bonded to each oxygen atom, and bonded with varying degrees of covalency and coordination to each of nitrogen atoms $N^1$ and $N^2$;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is independently, a hydrogen, a $C_1$-$C_{40}$ hydrocarbyl, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof, subject to the proviso that $R^{19}$ is not a carbazole or a substituted carbazole radical; and Y is a divalent hydrocarbyl radical covalently bonded to and bridging between both of the nitrogen atoms $N^1$ and $N^2$. In an embodiment according to the invention, two or more of $R^1$ to $R^{21}$ may independently join together to form a $C_4$ to $C_{62}$ cyclic or polycyclic ring structure. Accordingly, the instant disclosure in one embodiment is directed to non-symmetrical Salan catalysts. The Salan catalysts disclosed in this embodiment are devoid of a symmetry element, having a non-symmetric or non-palindromic structure. By non-symmetric, it is meant that the two phenol moieties of the Salan compound are substituted differently when comparing the substitutions of one phenol, which comprises a carbazole or substituted carbazole radical, and the other phenol which may comprise a differently substituted carbazole, or as is shown in the above structure does not comprise a carbazole or a substituted carbazole radical at position $R^{19}$ (i.e., subject to the proviso that $R^{19}$ is not a carbazole or a substituted carbazole radical).

In an embodiment according to the invention, a catalyst compound is represented by the structure

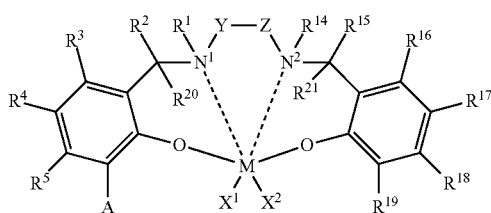

wherein A is represented by the structure attached at the carbazole nitrogen atom:

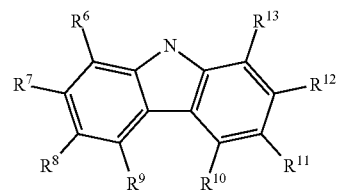

wherein each solid line represents a covalent bond and each dashed line represents a bond having varying degrees of covalency and a varying degree of coordination;

M is a Group 3, 4, 5 or 6 transition metal covalently bonded to each oxygen atom, and bonded with varying degrees of covalency and coordination to each of nitrogen atoms $N^1$ and $N^2$;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is independently, a hydrogen, a $C_1$-$C_{40}$ hydrocarbyl, a functional group comprising elements from Group 13-17 of the periodic table of the elements, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ may independently join together to form a $C_4$ to $C_{62}$ cyclic or polycyclic ring structure, or a combination thereof, subject to the proviso that $R^{19}$ is not identical to A; and Y and Z form a divalent hydrocarbyl radical covalently bonded to and bridging between both of the nitrogen atoms $N^1$ and $N^2$. In an embodiment according to the invention, Y is identical to Z. In an embodiment according to the invention, Y is different to Z. In an embodiment according to the invention, two or more of $R^1$ to $R^{21}$ may independently join together to form a $C_4$ to $C_{62}$ cyclic or polycyclic ring structure.

In an embodiment according to the invention, M is a Group 4 metal, or M is Hf, Ti and/or Zr, or M is Hf or Zr. In an embodiment according to the invention, each of $X^1$ and $X^2$ is independently selected from the group consisting of hydrocarbyl radicals having from 1 to 20 carbon atoms, hydrides, amides, and alkoxides having from 1 to 20 carbon atoms, sulfides, phosphides, halides, amines, phosphines, ethers, and combinations thereof.

In an embodiment according to the invention, $X^1$ and $X^2$ together form a part of a fused ring or a ring system having from 4 to 62 carbon atoms.

In an embodiment according to the invention, each of $X^1$ and $X^2$ is independently selected from the group consisting of halides, alkyl radicals having from 1 to 7 carbon atoms, benzyl radicals, or a combination thereof.

In an embodiment according to the invention, Y is a divalent $C_1$-$C_{40}$ hydrocarbyl radical comprising a portion that comprises a linker backbone comprising from 1 to 18 carbon atoms linking or bridging between nitrogen atoms $N^1$ and $N^2$. In an embodiment according to the invention, Y is a $C_1$-$C_{40}$ hydrocarbyl radical comprising a portion that comprises a linker backbone comprising from 1 to 18 carbon atoms linking the nitrogen atoms $N^1$ and $N^2$ wherein the hydrocarbyl comprises O, S, S(O), $S(O)_2$, $Si(R^*)_2$, $P(R^*)$, N or $N(R^*)$, wherein each $R^*$ is independently a $C_1$-$C_{18}$ hydrocarbyl. In an embodiment according to the invention, Y is selected from the group consisting of ethylene (—$CH_2CH_2$—) and 1,2-cyclohexylene, and/or —$CH_2CH_2CH_2$— derived from propylene. In an embodiment according to the invention, Y is —$CH_2CH_2CH_2$— derived from propylene.

In an embodiment according to the invention, each of $X^1$ and $X^2$ is, independently, a halogen or a $C_1$ to $C_7$ hydrocarbyl radical.

In an embodiment according to the invention, each of $X^1$ and $X^2$ is a benzyl radical. In an embodiment according to the invention, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, hydrogen, a halogen, or a $C_1$ to $C_{30}$ hydrocarbyl radical, or a $C_1$ to $C_{10}$ hydrocarbyl radical, subject to the proviso that $R^{19}$ is not a carbazole or a substituted carbazole radical. In an embodiment according to the invention, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is a methyl radical, a bromine, an adamantyl radical, or a combination thereof.

In an embodiment according to the invention, M is Zr; $X^1$ and $X^2$ are benzyl; $R^1$ and $R^{14}$ are methyl; $R^2$ through $R^{13}$, $R^{15}$, $R^{16}$, $R^{18}$, $R^{20}$ and $R^{21}$ are hydrogen; $R^{17}$ and $R^{19}$ are bromine; and Y is —$CH_2CH_2$—.

In an embodiment according to the invention, M is Zr; $X^1$ and $X^2$ are benzyl; $R^1$, $R^{14}$ and $R^{17}$ are methyl; $R^2$ through $R^{13}$, $R^{15}$, $R^{16}$, $R^{18}$, $R^{20}$ and $R^{21}$ are hydrogen; $R^{19}$ is 1-adamantyl; and Y is —$CH_2CH_2$—.

In an embodiment according to the invention, M is Hf; $X^1$ and $X^2$ are benzyl; $R^1$ and $R^{14}$ are methyl; $R^2$ through $R^{13}$, $R^{15}$, $R^{16}$, $R^{18}$, $R^{20}$ and $R^{21}$ are hydrogen; $R^{17}$ is methyl; $R^{19}$ is 1-adamantyl; and Y is —$CH_2CH_2$—.

In an embodiment according to the invention, the catalyst comprises a compound represented by the formula:

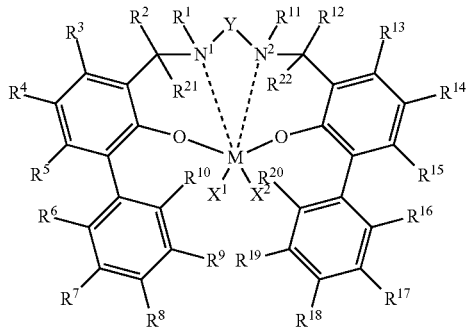

where each solid line represents a covalent bond and each dashed line represents a bond having varying degrees of covalency and a varying degree of coordination;

M is a Group 3, 4, 5 or 6 transition metal covalently bonded to each oxygen atom, and bonded with varying degrees of covalency and coordination to each of nitrogen atoms $N^1$ and $N^2$;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or a combination thereof;

wherein at least one of $R^6$, $R^7$, $R^8$, $R^9$, $R^{10}$, $R^{16}$, $R^{17}$, $R^{18}$, $R^{19}$, or $R^{20}$ comprise fluorine; and Y is a divalent hydrocarbyl radical covalently bonded to and bridging between both of the nitrogen atoms $N^1$ and $N^2$.

In an embodiment according to the invention, two or more of $R^1$ to $R^{22}$ may independently join together to form a $C_4$ to $C_{62}$ cyclic or polycyclic ring structure. Accordingly, the instant disclosure is directed to non-symmetrical Salan catalysts. The Salan catalysts disclosed herein are at least partially fluorinated, and may include perfluorinated or partially perfluorinated aromatic ring systems as substituents.

In an embodiment according to the invention, the catalyst compound is represented by the following formula:

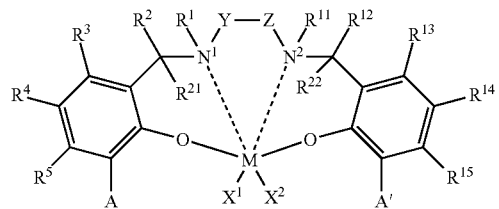

wherein substituent A is represented by the following formula, attached to the benzene ring:

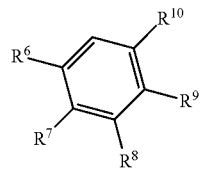

wherein substituent A' is represented by the following formula attached to the benzene ring:

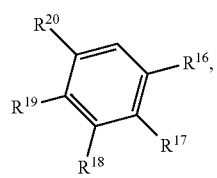

where each solid line represents a covalent bond and each dashed line represents a bond having varying degrees of covalency and a varying degree of coordination;

M is a Group 3, 4, 5 or 6 transition metal covalently bonded to each oxygen atom, and bonded with varying degrees of covalency and coordination to each of nitrogen atoms $N^1$ and $N^2$;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or a combination thereof;

at least one of $R^6$, $R^7$, $R^8$, $R^9$, $R^{10}$, $R^{16}$, $R^{17}$, $R^{18}$, $R^{19}$, or $R^{20}$ comprise fluorine; and Y and Z form divalent hydrocarbyl radical covalently bonded to and bridging between both of the nitrogen atoms $N^1$ and $N^2$. In an embodiment according to the invention, two or more of $R^1$ to $R^{22}$ may independently join together to form a $C_4$ to $C_{62}$ cyclic or polycyclic ring structure. In an embodiment according to the invention, Y is identical to Z. In an embodiment according to the invention, Y is different than Z.

For purposes herein, a perfluorinated ring is defined as a ring system wherein each of the available hydrogen atoms are substituted with a fluorine atom, also referred to as a fluoride.

In an embodiment according to the invention, M is a Group 4 metal, or M is Hf, Ti and/or Zr, or M is Ti or Zr. In an embodiment according to the invention, each of $X^1$ and $X^2$ is independently selected from the group consisting of hydrocarbyl radicals having from 1 to 20 carbon atoms, hydrides, amides, and alkoxides having from 1 to 20 carbon atoms, sulfides, phosphides, halides, amines, phosphines, ethers, and combinations thereof.

In an embodiment according to the invention, $X^1$ and $X^2$ together form a part of a fused ring or a ring system having from 4 to 62 carbon atoms.

In an embodiment according to the invention, each of $X^1$ and $X^2$ is independently selected from the group consisting of halides, alkyl radicals having from 1 to 7 carbon atoms, benzyl radicals, or a combination thereof.

In an embodiment according to the invention, Y is a divalent $C_1$-$C_{40}$ hydrocarbyl radical comprising a portion that comprises a linker backbone comprising from 1 to 18 carbon atoms linking or bridging between nitrogen atoms $N^1$ and $N^2$. In an embodiment according to the invention, Y is a $C_1$-$C_{40}$ hydrocarbyl radical comprising a portion that comprises a linker backbone comprising from 1 to 18 carbon atoms linking the nitrogen atoms $N^1$ and $N^2$ wherein the hydrocarbyl comprises O, S, S(O), S(O)$_2$, Si(R*)$_2$, P(R*), N or N(R*), wherein each R* is independently a $C_1$-$C_{18}$ hydrocarbyl. In an embodiment according to the invention, Y is selected from the group consisting of ethylene (—CH$_2$CH$_2$—) and 1,2-cyclohexylene, and/or —CH$_2$CH$_2$CH$_2$— derived from propylene. In an embodiment according to the invention, Y is —CH$_2$CH$_2$CH$_2$— derived from propylene.

In an embodiment according to the invention, each of $X^1$ and $X^2$ is, independently, a halogen or a $C_1$ to $C_7$ hydrocarbyl radical. In an embodiment according to the invention, each of $X^1$ and $X^2$ is a benzyl radical.

In an embodiment according to the invention, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, hydrogen, a halogen, or a $C_1$ to $C_{30}$ hydrocarbyl radical, or a $C_1$ to $C_{10}$ hydrocarbyl radical.

In an embodiment according to the invention, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is a methyl radical, or a fluoride, which may also be referred to as a fluorine or a fluorine functional group.

In an embodiment according to the invention, M is Ti; $X^1$ and $X^2$ are benzyl radicals; $R^1$ and $R^{11}$ are methyl radicals; $R^2$, $R^3$, $R^5$, $R^{12}$, $R^{13}$, $R^{15}$, $R^{21}$ and $R^{22}$ are hydrogen; $R^4$, $R^6$, $R^7$, $R^8$, $R^9$, $R^{10}$, $R^{14}$, $R^{16}$, $R^{17}$, $R^{18}$, $R^{19}$, and $R^{20}$ are fluorine; and Y is —CH$_2$CH$_2$—.

In an embodiment according to the invention, M is Ti; $X^1$ and $X^2$ are benzyl radicals; $R^1$, $R^4$, $R^{11}$, and $R^{14}$ are methyl radicals; $R^2$, $R^3$, $R^5$, $R^{12}$, $R^{13}$, $R^{15}$, $R^{21}$ and $R^{22}$ are hydrogen; $R^6$, $R^7$, $R^8$, $R^9$, $R^{10}$, $R^{16}$, $R^{17}$, $R^{18}$, $R^{19}$, and $R^{20}$ are fluorine; and Y is —CH$_2$CH$_2$—.

In an embodiment according to the invention, M is Zr; $X^1$ and $X^2$ are benzyl radicals; $R^1$ and $R^{11}$ are methyl radicals; $R^2$, $R^3$, $R^5$, $R^{12}$, $R^{13}$, $R^{15}$, $R^{21}$ and $R^{22}$ are hydrogen; $R^4$, $R^6$, $R^7$, $R^8$, $R^9$, $R^{10}$, $R^{14}$, $R^{16}$, $R^{17}$, $R^{18}$, $R^{19}$, and $R^{20}$ are fluorine; and Y is —CH$_2$CH$_2$—.

In an embodiment according to the invention, M is Zr; $X^1$ and $X^2$ are benzyl radicals; $R^1$, $R^4$, $R^{11}$, and $R^{14}$ are methyl radicals; $R^2$, $R^3$, $R^5$, $R^{12}$, $R^{13}$, $R^{15}$, $R^{21}$ and $R^{22}$ are hydrogen; $R^6$, $R^7$, $R^8$, $R^9$, $R^{10}$, $R^{16}$, $R^{17}$, $R^{18}$, $R^{19}$, and $R^{20}$ are fluorine; and Y is —CH$_2$CH$_2$—.

In an embodiment according to the invention, two or more different catalyst compounds are present in the catalyst system used herein. In an embodiment according to the invention, two or more different catalyst compounds are present in the reaction zone where the process(es) described herein occur. When two transition metal compound based catalysts are used in one reactor as a mixed catalyst system, the two transition metal compounds are chosen such that the two are compatible. Compatible catalysts are those catalysts having similar kinetics of termination and insertion of monomer and comonomer(s) and/or do not detrimentally interact with each other. For purposes herein, the term "incompatible catalysts" refers to and means catalysts that satisfy one or more of the following:

1) those catalysts that when present together reduce the activity of at least one of the catalysts by greater than 50%;

2) those catalysts that under the same reactive conditions produce polymers such that one of the polymers has a molecular weight that is more than twice the molecular weight of the other polymer; and 3) those catalysts that differ in comonomer incorporation or reactivity ratio under the same conditions by more than about 30%. A simple screening method such as by $^1$H or $^{13}$C NMR, known to those of ordinary skill in the art, can be used to determine which transition metal compounds are compatible. In an embodiment according to the invention, the catalyst systems use the same activator for the catalyst compounds. In an embodiment according to the invention, two or more different activators, such as a non-coordinating anion activator and an alumoxane, can be used in combination. If one or more catalyst compounds contain an $X^1$ or $X^2$ ligand which is not a hydride, or a hydrocarbyl, then in an embodiment according to the invention, the alumoxane is contacted with the catalyst compounds prior to addition of the non-coordinating anion activator.

In an embodiment according to the invention, when two transition metal compounds (pre-catalysts) are utilized, they may be used in any ratio. In an embodiment according to the invention, a molar ratio of a first transition metal compound (A) to a second transition metal compound (B) will fall within the range of (A:B) 1:1000 to 1000:1, or 1:100 to 500:1, or 1:10 to 200:1, or 1:1 to 100:1, or 1:1 to 75:1, or 5:1 to 50:1. The particular ratio chosen will depend on the exact pre-catalysts chosen, the method of activation, and the end product desired. In an embodiment according to the invention, when using two pre-catalysts, where both are activated with the same activator, useful mole percents, based upon the total moles of the pre-catalysts, are 10:90 to 0.1:99, or 25:75 to 99:1, or 50:50 to 99.5:0.5, or 50:50 to 99:1, or 75:25 to 99:1, or 90:10 to 99:1.

Methods to Prepare the Catalyst Compounds

In embodiments the symmetric transition metal compounds may be prepared by two general synthetic routes. The parent Salan ligands are prepared by a one-step Mannich reaction from the parent phenol (Reaction A) or by a two-step imine-condensation/alkylation procedure if the salicylaldehyde is used (Reaction B). The ligand is then converted into the metal dibenzyl catalyst precursor by reaction with the metal tetra-aryl starting material, e.g., tetrabenzyl, to yield the finished complex (Reaction C).

Reaction A:

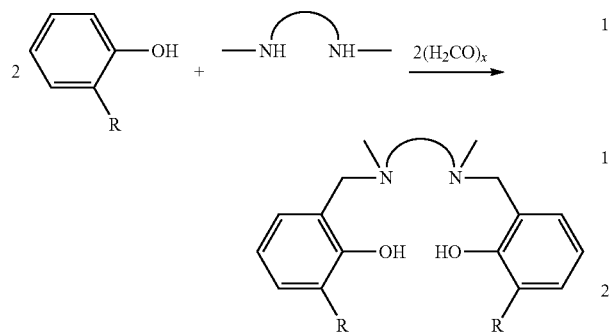

Reaction B:

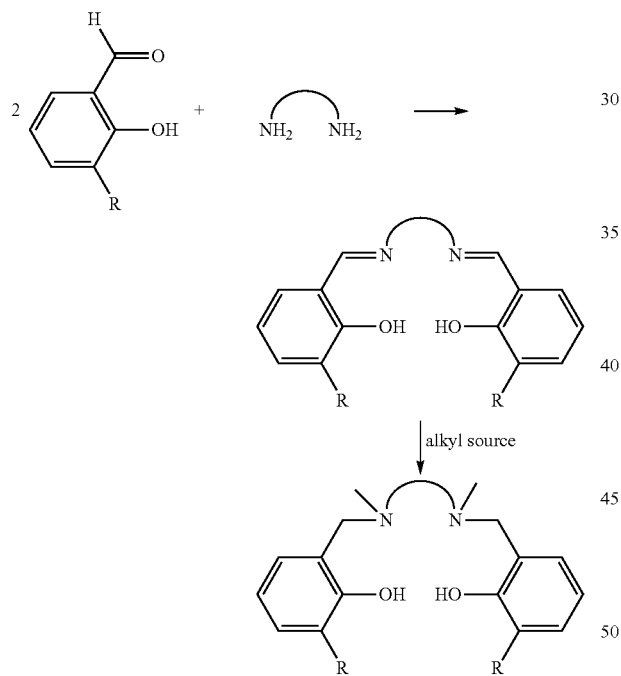

Reaction C:

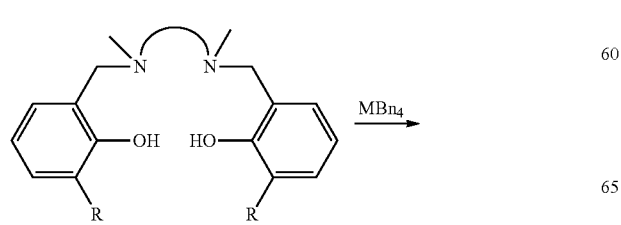

-continued

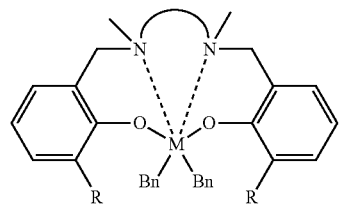

Asymmetric transition metal compounds may be prepared by a step-wise synthetic route. The parent Salan ligands may be prepared by reaction of the salicylaldehyde with the diamine, followed by reduction with $NaBH_4$. The asymmetric ligand may then be formed by an HBr elimination reaction with a bromomethylphenol (Reaction D). The ligand may then be converted into the metal dibenzyl catalyst precursor by reaction with the metal tetrabenzyl starting material to yield the finished complex (Reaction E).

Reaction D:

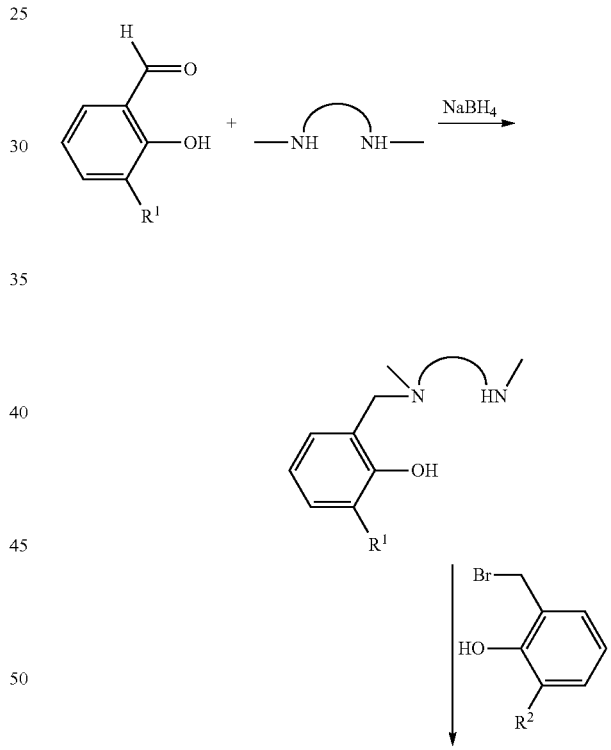

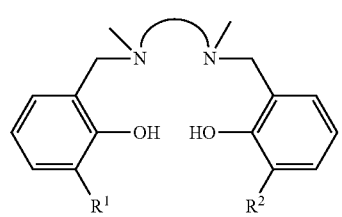

Reaction E:

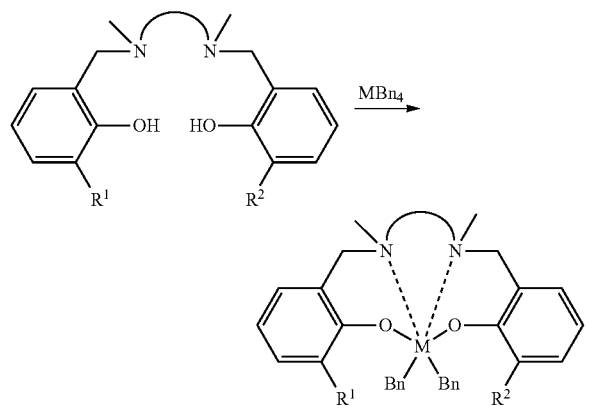

Activators

The terms "cocatalyst" and "activator" are used interchangeably to describe activators and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Activators may include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— sub-units, where $R^1$ is an alkyl radical. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the catalyst precursor compound comprises an abstractable ligand which is an alkyl, halide, alkoxide or amide. Mixtures of different alumoxanes and modified alumoxanes may also be used. In an embodiment according to the invention, visually clear methylalumoxane may be used. A cloudy or gelled alumoxane can be filtered to produce a clear solution or clear alumoxane can be decanted from the cloudy solution. A useful alumoxane is a modified methyl alumoxane (MMAO) described in U.S. Pat. No. 5,041,584 and/or commercially available from Akzo Chemicals, Inc. under the trade designation Modified Methylalumoxane type 3A. Solid alumoxanes may also be used.

In an embodiment according to the invention, the activator is a TMA-depleted activator (where TMA is the abbreviation for trimethylaluminum). The inventors have advantageously found that using a TMA-depleted alkyl alumoxane contributes to producing a polymer with higher allyl chain ends. Commercial alumoxanes, such as methylalumoxane (MAO) and isobutylalumoxane, often tend to comprise some residual starting material as an impurity. For example, one common method of making MAO is the hydrolysis of trimethylaluminum (TMA). Such hydrolysis, however, tends to leave residual TMA in the MAO which may have negative effects on polymerization. Any methods known in the art to remove TMA may be used. In an embodiment according to the invention, for example, to produce a TMA-depleted activator, a solution of alumoxane (such as methylalumoxane), for example, 30 wt % in toluene may be diluted in toluene and the aluminum alkyl (such as TMA in the case of MAO) is removed from the solution, for example, by combination with trimethylphenol and filtration of the solid. In an embodiment according to the invention, the TMA-depleted activator comprises from about 1 wt % to about 14 wt % trimethylaluminum, or less than 13 wt %, or less than 12 wt %, or less than 10 wt %, or less than 5 wt %, or 0 wt %, and/or, greater than 0 wt %, or greater than 1 wt %.

When the activator is an alumoxane (modified or unmodified), in an embodiment according to the invention, the maximum amount of activator is typically about 5000-fold molar excess Al/M over the catalyst compound (per metal catalytic site). In an embodiment according to the invention, the minimum activator-to-catalyst-compound determined according to molar concentration of the transition metal M is typically about 1 mole aluminum or less to mole of transition metal M. In an embodiment according to the invention, the activator comprises alumoxane and the alumoxane is present at a ratio of 1 mole aluminum or more to mole of catalyst compound. In an embodiment according to the invention, the minimum activator-to-catalyst-compound molar ratio is typically a 1:1 molar ratio. Other examples of Al:M ranges include from 1:1 to 500:1, or from 1:1 to 200:1, or from 1:1 to 100:1, or from 1:1 to 50:1.

In an embodiment according to the invention, little or no alumoxane (i.e., less than 0.001 wt %) is used in the polymerization processes described herein. In an embodiment according to the invention, alumoxane is present at 0.00 mole %, or the alumoxane is present at a molar ratio of aluminum to catalyst compound transition metal less than 500:1, or less than 300:1, or less than 100:1, or less than 1:1.

Scavengers or Co-Activators

In an embodiment according to the invention, the catalyst system may further include scavengers and/or co-activators. Suitable aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used. In an embodiment according to the invention, the scavengers and/or co-activators are present at less than 14 wt %, or from 0.1 to 10 wt %, or from 0.5 to 7 wt %, by weight of the catalyst system.

Supports

In an embodiment according to the invention, the catalyst system may comprise an inert support material. In an embodiment according to the invention, the support material comprises a porous support material, for example, talc, and/or inorganic oxides. Other suitable support materials include zeolites, clays, organoclays, or any other organic or inorganic support material and the like, or mixtures thereof.

In an embodiment according to the invention, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, and/or alumina include magnesia, titania, zirconia, montmorillonite, phyllosilicate, and/or the like, as well as combinations of these support materials including silica-chromium, silica-alumina, silica-titania, and the like. In an embodiment according to the invention, the support materials include $Al_2O_3$, $ZrO_2$, $SiO_2$, $SiO_2/Al_2O_3$, and combinations thereof. Other suitable support materials include finely divided functionalized polyolefins, such as finely divided polyethylene.

In an embodiment according to the invention, the support material may have a surface area in the range of from about 10 to about 700 $m^2$/g, pore volume in the range of from about 0.1 to about 4.0 cc/g and average particle size in the range of from about 5 to about 500 µm, or the surface area of the support material is in the range of from about 50 to about 500 $m^2$/g, pore volume of from about 0.5 to about 3.5 cc/g and average particle size of from about 10 to about 200 µm. In an embodiment according to the invention, a majority portion of the surface area of the support material is in the range is from about 100 to about 400 $m^2$/g, pore volume from about 0.8 to about 3.0 cc/g and average particle size is from about 5 to about 100 µm. In an embodiment according to the invention, the average pore size of the support material is in the range of from 10 to 1000 Å, or 50 to about 500 Å, or 75 to about 350 Å. In an embodiment according to the invention, the support material is a high surface area, amorphous silica having a surface area greater than or equal to about 300 $m^2$/g, and/or a pore volume of 1.65 $cm^3$/gm. Suitable silicas are marketed under the tradenames of Davison 952 or Davison 955 by the Davison Chemical Division of W.R. Grace and Company. In an embodiment according to the invention, the support may comprise Davison 948.

In an embodiment according to the invention, the support material should be essentially dry, that is, essentially free of absorbed water. Drying of the support material can be effected by heating or calcining at about 100° C. to about 1000° C., or at a temperature of at least about 400° C., or 500° C., or 600° C. When the support material is silica, it is heated to at least 200° C., or about 200° C. to about 850° C., or at least 600° C. for a time of about 1 minute to about 100 hours, or from about 12 hours to about 72 hours, or from about 24 hours to about 60 hours. In an embodiment according to the invention, the calcined support material must have at least some reactive hydroxyl (OH) groups to produce supported catalyst systems according to the instant disclosure.

In an embodiment according to the invention, the calcined support material is contacted with at least one polymerization catalyst comprising at least one catalyst compound and an activator. In an embodiment according to the invention, the support material, having reactive surface groups, typically hydroxyl groups, is slurried in a non-polar solvent and the resulting slurry is contacted with a solution of a catalyst compound and an activator. In an embodiment according to the invention, the slurry of the support material is first contacted with the activator for a period of time in the range of from about 0.5 hours to about 24 hours, or from about 2 hours to about 16 hours, or from about 4 hours to about 8 hours. The solution of the catalyst compound is then contacted with the isolated support/activator. In an embodiment according to the invention, the supported catalyst system is generated in situ. In an alternate embodiment, the slurry of the support material is first contacted with the catalyst compound for a period of time in the range of from about 0.5 hours to about 24 hours, or from about 2 hours to about 16 hours, or from about 4 hours to about 8 hours. The slurry of the supported catalyst compound is then contacted with the activator solution.

In an embodiment according to the invention, the mixture of the catalyst, activator and support is heated to about 0° C. to about 70° C., or to about 23° C. to about 60° C., or to room temperature. Contact times typically range from about 0.5 hours to about 24 hours, or from about 2 hours to about 16 hours, or from about 4 hours to about 8 hours.

Suitable non-polar solvents are materials in which all of the reactants used herein, i.e., the activator and the catalyst compound are at least partially soluble and which are liquid at reaction temperatures. Suitable non-polar solvents include alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In an embodiment according to the invention, the activator, the catalyst compound, or a combination thereof is supported by contacting the activator, the catalyst compound, or both with a support to form a supported activator, supported catalyst, or a combination thereof, wherein the activator, the catalyst compound, or a combination thereof are deposited on, vaporized with, bonded to, incorporated within, adsorbed or absorbed in, or on, the support.

In an embodiment according to the invention, the catalyst compounds, activators and/or catalyst systems disclosed herein may be combined with one or more support materials or carriers. For example, in an embodiment according to the invention, the activator is contacted with a support to form a supported activator wherein the activator is deposited on, contacted with, vaporized with, bonded to, or incorporated within, adsorbed or absorbed in, or on, a support or carrier.

In an embodiment according to the invention, the catalyst, the activator, or a combination thereof may be supported using "incipient wetness", wherein a solution comprising the activator, the catalyst compound, or a combination thereof is contacted with the support wherein the amount of the solution is about 95 to about 100 percent of the absorptive capacity of the support material.

In an embodiment according to the invention, the support material is chemically treated and/or dehydrated prior to combining with the catalyst compound, activator and/or catalyst system. In an embodiment according to the invention, the support material may have various levels of dehydration, such as may be achieved by drying the support material at temperatures in the range from about 200° C. to about 1000° C. These supports may also be chemically dehydrated using water reactive compounds such as silane and organoaluminum compounds.

In an embodiment according to the invention, dehydrated silica may be contacted with an organoaluminum or alumoxane compound. In an embodiment according to the invention, wherein an organoaluminum compound is used, the activator is formed in situ in the support material as a result of the reaction of, for example, trimethylaluminum and water.

In an embodiment according to the invention, Lewis base-containing support substrates will react with a Lewis acidic activator to form a support bonded Lewis acid compound. The Lewis base hydroxyl groups of silica are exemplary of metal/metalloid oxides where this method of bonding to a support occurs. These embodiments are described in, for example, U.S. Pat. No. 6,147,173.

Other embodiments of supporting an activator are described in U.S. Pat. No. 5,427,991, where supported non-coordinating anions derived from trisperfluorophenyl boron are described; U.S. Pat. No. 5,643,847, discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions.

In an embodiment according to the invention, the supported activator is formed by preparing, in an agitated, temperature and pressure controlled vessel, a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 34.5 kPa to 138 kPa (5 psia to 20 psia). An inert gas sweep can also be used in assist in removing solvent. Alternate orders of addition, such as slurrying the support material in an appropriate solvent then adding the activator, can be used.

In an embodiment according to the invention, the weight percent of the activator to the support material is in the range from about 10 weight percent to about 70 weight percent, in the range from about 20 weight percent to about 60 weight percent in other embodiments, in the range from about 30 weight percent to about 50 weight percent in other embodiments, and in the range from about 30 weight percent to about 40 weight percent in yet other embodiments.

Supported catalysts system useful in embodiments disclosed herein include those supported catalyst systems that are formed by contacting a support material, an activator and a catalyst compound in various ways under a variety of conditions outside of a catalyst feeder apparatus.

In an embodiment according to the invention, a catalyst compound, activator and support, may be fed into the polymerization reactor as a mineral oil slurry or as a slurry in liquid diluent. Solids concentrations in the mineral oil or liquid diluent may range from about 3 to about 30 weight percent in some embodiments; and from about 10 to about 25 weight percent in other embodiments.

In an embodiment according to the invention, the catalyst compound(s), activator(s) and/or support(s) used herein may also be spray dried separately or together prior to being injected into the reactor. The spray dried catalyst may be used as a powder or solid or may be placed in a diluent and slurried into the reactor. In an embodiment according to the invention, a support is combined with one or more activators and is spray dried to form a supported activator. In an embodiment according to the invention, fumed silica is combined with methyl alumoxane and then spray dried to from supported methyl alumoxane, a support may be combined with alumoxane, spray dried and then placed in mineral oil to form a slurry useful according to the instant disclosure. In an embodiment according to the invention, the catalyst compounds described above may be combined with one or more support material(s) and/or one or more activator(s) and spray dried prior to being combined with a slurry diluent.

In an embodiment according to the invention, the catalyst compounds and/or the activators are combined with a support material such as a particulate filler material and then spray dried, which may form a free flowing powder. Spray drying may be by any means known in the art. In an embodiment according to the invention, the catalyst may be spray dried by placing the catalyst compound and the activator in solution, allowing the catalyst compound and activator to react, if desired, adding a filler material such as silica and/or fumed silica, then forcing the solution at high pressures through a nozzle. The solution may be sprayed onto a surface or sprayed such that the droplets dry in midair. The method generally employed is to disperse the silica in toluene, stir in the activator solution, and then stir in the catalyst compound solution. Slurry concentrations may be about 5 to 8 wt %. This formulation may sit as a slurry for as long as 30 minutes with mild stirring or manual shaking to keep it as a suspension before spray-drying. In an embodiment according to the invention, the makeup of the dried material is about 40-50 wt % activator (e.g., alumoxane), 50-60 $SiO_2$ and about 2 wt % catalyst compound.

In an embodiment according to the invention, two or more catalyst compounds can be added together in the desired ratio in the last step. In another embodiment, more complex procedures are possible, such as addition of a first catalyst compound to the activator/filler mixture for a specified reaction time t, followed by the addition of the second catalyst compound solution, mixed for another specified time x, after which the mixture is cosprayed. Lastly, another additive, such as 1-hexene in about 10 vol % can be present in the activator/filler mixture prior to the addition of the first catalyst compound.

In an embodiment according to the invention, binders are added to the mix. These can be added as a means of improving the particle morphology, i.e. narrowing the particle size distribution, lower porosity of the particles and allowing for a reduced quantity of alumoxane, which is acting as the "binder".

In an embodiment according to the invention, spray dried particles are fed into the polymerization reactor as a mineral oil slurry. Solids concentrations in oil are about 10 to 30 wt %, or 15 to 25 wt %. In an embodiment according to the invention, the spray dried particles can be from less than about 10 micrometers in size up to about 100 micrometers, compared to conventional supported catalysts which are about 50 micrometers. In an embodiment according to the invention, the support has an average particle size of 1 to 50 microns, or 10 to 40 microns.

In an embodiment according to the invention, a catalyst composition according to the instant disclosure is utilized in a catalyst component slurry and/or in a catalyst component solution. For the purposes of the instant disclosure, a slurry is defined to be a suspension of a solid, where the solid may or may not be porous, in a liquid. The catalyst component slurry and the catalyst component solution are combined to form the catalyst composition which is then introduced into a polymerization reactor. In an embodiment according to the invention, the catalyst component slurry includes an activator and a support, or a supported activator. In an embodiment according to the invention, the slurry also includes a catalyst compound in addition to the activator and the support and/or the supported activator. In an embodiment according to the invention, the catalyst compound in the slurry is supported. In an embodiment according to the invention, the slurry includes one or more activator(s) and support(s) and/or supported activator(s) and/or one more catalyst compound(s). For example, the slurry may include two or more activators (such as a supported alumoxane and a modified alumoxane) and a catalyst compound, or the slurry may include a supported activator and more than one catalyst compounds. In an embodiment according to the invention, the slurry comprises a supported activator and two catalyst compounds.

In an embodiment according to the invention, the slurry comprises supported activator and two different catalyst compounds, which may be added to the slurry separately or in combination. In an embodiment according to the invention, the slurry, containing a supported alumoxane, is contacted with a catalyst compound, allowed to react, and thereafter the slurry is contacted with another catalyst compound. In another embodiment the slurry containing a supported alumoxane is contacted with two catalyst compounds at the same time, and allowed to react. In an embodiment according to the invention, the molar ratio of metal in the activator to metal in the catalyst compound in the slurry is 1000:1 to 0.5:1, or 300:1 to 1:1, or 150:1 to 1:1.

Polymerization Processes

In an embodiment according to the invention, a polymerization process includes contacting monomers (such as ethylene and propylene), and optionally comonomers, with a catalyst system comprising an activator and at least one catalyst compound, as described above. In an embodiment according to the invention, the catalyst compound and activator may be combined in any order, and may be combined prior to contacting with the monomer. In an embodiment according to the invention, the catalyst compound and/or the activator are combined after contacting with the monomer.

Monomers useful herein include substituted or unsubstituted $C_2$ to $C_{40}$ alpha olefins, or $C_2$ to $C_{20}$ alpha olefins, or $C_2$ to $C_{12}$ alpha olefins, or ethylene, propylene, butene, pentene, hexene, heptene, octene, nonene, decene, undecene, dodecene and isomers thereof. In an embodiment according to the invention, the monomer comprises propylene and an optional comonomer(s) comprising one or more ethylene or $C_4$ to $C_{40}$ olefins, or $C_4$ to $C_{20}$ olefins, or $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In an embodiment according to the invention, the monomer comprises ethylene or ethylene and a comonomer comprising one or more $C_3$ to $C_{40}$ olefins, or $C_4$ to $C_{20}$ olefins, or $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, or norbornene, norbornadiene, and dicyclopentadiene.

In an embodiment according to the invention, one or more dienes are present in the polymer produced herein at up to 10 weight %, or at 0.00001 to 1.0 weight %, or 0.002 to 0.5 weight %, or 0.003 to 0.2 weight %, based upon the total weight of the composition. In an embodiment according to the invention, 500 ppm or less of diene is added to the polymerization, or 400 ppm or less, or 300 ppm or less. In an embodiment according to the invention, at least 50 ppm of diene is added to the polymerization, or 100 ppm or more, or 150 ppm or more.

Diolefin monomers useful in this invention include any hydrocarbon structure, or $C_4$ to $C_{30}$, having at least two unsaturated bonds, wherein at least two of the unsaturated bonds are readily incorporated into a polymer by either a stereospecific or a non-stereospecific catalyst(s). In an embodiment according to the invention, the diolefin monomers may be selected from alpha, omega-diene monomers (i.e. di-vinyl monomers). Preferably, the diolefin monomers are linear di-vinyl monomers, most or those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

In an embodiment according to the invention, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Polymerization processes according to the instant disclosure may be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are suitable for use herein; wherein a homogeneous polymerization process is defined to be a process where at least 90 wt % of the product is soluble in the reaction media. A bulk homogeneous process is suitable for use herein, wherein a bulk process is defined to be a process where monomer concentration in all feeds to the reactor is 70 volume % or more. In an embodiment according to the invention, no solvent or diluent is present or added in the reaction medium, (except for the small amounts used as the carrier for the catalyst system or other additives, or amounts typically found with the monomer; e.g., propane in propylene). In an embodiment according to the invention, the process is a slurry process. As used herein the term "slurry polymerization process" means a polymerization process where a supported catalyst is employed and monomers are polymerized on the supported catalyst particles. At least 95 wt % of polymer products derived from the supported catalyst is in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In an embodiment according to the invention, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In an embodiment according to the invention, the solvent is not aromatic, or aromatics are present in the solvent at less than 1 wt %, or less than 0.5 wt %, or less than 0.0 wt % based upon the weight of the solvents.

In an embodiment according to the invention, the feed concentration of the monomers and comonomers for the polymerization is 60 vol % solvent or less, or 40 vol % or less, or 20 vol % or less, based on the total volume of the feedstream. The polymerization may also be run in a bulk process.

Polymerizations can be run at any temperature and/or pressure suitable to obtain the desired ethylene polymers. Suitable temperatures and/or pressures include a temperature in the range of from about 0° C. to about 300° C., or about 20° C. to about 200° C., or about 35° C. to about 150° C., or about 50° C. to about 150° C., or from about 40° C. to about 120° C., or from about 45° C. to about 80° C.; and at a pressure in the range of from about 0.35 MPa to about 10 MPa, or from about 0.45 MPa to about 6 MPa, or from about 0.5 MPa to about 4 MPa.

In an embodiment according to the invention, the run time of the reaction is from about 0.1 minutes to about 24 hours, or up to 16 hours, or in the range of from about 5 to 250 minutes, or from about 10 to 120 minutes.

In an embodiment according to the invention, hydrogen is present in the polymerization reactor at a partial pressure of 0.007 kPa to 345 kPa (0.001 to 50 psig), or from 0.07 kPa to 172 kPa (0.01 to 25 psig), or 0.7 kPa to 70 kPa (0.1 to 10 psig).

In an embodiment according to the invention, the activity of the catalyst is at least 50 g/mmol/hour, or 500 or more g/mmol/hour, or 5000 or more g/mmol/hr, or 50,000 or more g/mmol/hr. In an alternate embodiment, the conversion of olefin monomer is at least 10%, based upon polymer yield and the weight of the monomer entering the reaction zone, or 20% or more, or 30% or more, or 50% or more, or 80% or more.

In an embodiment according to the invention, the polymerization conditions include one or more of the following: 1) temperatures of 0 to 300° C. (or 25 to 150° C., or 40 to 120° C., or 45 to 80° C.); 2) a pressure of atmospheric pressure to 10 MPa (or 0.35 to 10 MPa, or from 0.45 to 6 MPa, or from 0.5 to 4 MPa); 3) the presence of an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; or where aromatics are or present in the solvent at less than 1 wt %, or less than 0.5 wt %, or at 0 wt % based upon the weight of the solvents); 4) wherein the catalyst system used in the polymerization comprises less than 0.5 mol %, or 0 mol % alumoxane, or the alumoxane is present at a molar ratio of aluminum to transition metal less than 500:1, or less than 300:1, or less than 100:1, or less than 1:1; 5) the polymerization or occurs in one reaction zone; 6) the productivity of the catalyst compound is at least 80,000 g/mmol/hr (or at least 150,000 g/mmol/hr, or at least 200,000 g/mmol/hr, or at least 250,000 g/mmol/hr, or at least 300,000 g/mmol/hr); 7) scavengers (such as trialkyl aluminum compounds) are absent (e.g., present at zero mol %) or the scavenger is present at a molar ratio of scavenger to transition metal of less than 100:1, or less than 50:1, or less than 15:1, or less than 10:1; and/or 8) optionally hydrogen is present in the polymerization reactor at a partial pressure of 0.007 to 345 kPa (0.001 to 50 psig) (or from 0.07 to 172 kPa (0.01 to 25 psig), or 0.7 to 70 kPa (0.1 to 10 psig)).

In an embodiment according to the invention, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment according to the invention, the polymerization occurs in one reaction zone.

Polyolefin Products

The instant disclosure also relates to compositions of matter produced by the methods described herein.

In an embodiment according to the invention, the process described herein produces propylene homopolymers or propylene copolymers, such as propylene-ethylene and/or propylene-α-olefin (or $C_3$ to $C_{20}$) copolymers (such as propylene-hexene copolymers or propylene-octene copolymers) having an Mw/Mn of greater than 1 to 4 (or greater than 1 to 3).

Likewise, the process of this invention produces olefin polymers, or polyethylene and polypropylene homopolymers and copolymers. In an embodiment according to the invention, the polymers produced herein are homopolymers of ethylene or propylene, are copolymers of ethylene or having from 0 to 25 mole % (or from 0.5 to 20 mole %, or from 1 to 15 mole %, or from 3 to 10 mole %) of one or more $C_3$ to $C_{20}$ olefin comonomer (or $C_3$ to $C_{12}$ alpha-olefin, or propylene, butene, hexene, octene, decene, dodecene, or propylene, butene, hexene, octene), or are copolymers of propylene or having from 0 to 25 mole % (or from 0.5 to 20 mole %, or from 1 to 15 mole %, or from 3 to 10 mole %) of one or more of $C_2$ or $C_4$ to $C_{20}$ olefin comonomer (or ethylene or $C_4$ to $C_{12}$ alpha-olefin, or ethylene, butene, hexene, octene, decene, dodecene, or ethylene, butene, hexene, octene).

In an embodiment according to the invention, the monomer is ethylene and the comonomer is hexene, or from 1 to 15 mole % hexene, or 1 to 10 mole % hexene.

In an embodiment according to the invention, the polymers produced herein have an Mw of 5,000 to 1,000,000 g/mol (e.g., 25,000 to 750,000 g/mol, or 50,000 to 500,000 g/mol), and/or an Mw/Mn of greater than 1 to 40, or 1.2 to 20, or 1.3 to 10, or 1.4 to 5, or 1.5 to 4, or 1.5 to 3.

In an embodiment according to the invention, the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

Unless otherwise indicated Mw, Mn, MWD are determined by GPC as described in US 2006/0173123 page 24-25, paragraphs [0334] to [0341], and/or by $^1$H NMR as described herein.

In an embodiment according to the invention, the polymers may be linear in character, which may be determined by elution fractionation, wherein non-linear polymers have a CDBI of less than 45%, whereas linear polyethylene types refer to polyethylene having a CDBI of greater than 50%, the CDBI being determined as described in WO93/03093 (U.S. Pat. No. 5,206,075). In an embodiment according to the invention, the polymer produced herein has a composition distribution breadth index (CDBI) of 50% or more, or 60% or more, or 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Polymers with an Mw/Mn of 4.5 or less may include a significant level of long chain branching. The long chain branching is understood to be the result of the incorporation of terminally unsaturated polymer chains (formed by the specific termination reaction mechanism encountered with single site catalysts) into other polymer chains in a manner analogous to monomer incorporation. The branches are hence believed to be linear in structure and may be present at a level where no peaks can be specifically attributed to such long chain branches in the $^{13}$C NMR spectrum. In an embodiment according to the invention, the polymers produced according to the instant disclosure comprise a significant amount of long chain branching, defined as having a ratio of long chain branching of at least 7 carbons per 1000 carbon atoms as determined according to the $^{13}$C NMR spectrum of greater than 0.5. In an embodiment according to the invention, the ratio of long chain branching with branches having at least 7 carbons, per 1000 carbon atoms as determined according to the $^{13}$C NMR spectrum is greater than 1, or greater than 1.5, or greater than 2.

In an embodiment according to the invention, the polymers produced according to the instant disclosure include a significant amount of vinyl termination, defined as a ratio of vinyl groups per molecule of greater than or equal to 0.2. In an embodiment according to the invention, the polymers according to the instant disclosure comprise a ratio of vinyl groups per molecule of greater than or equal to 0.5, or 0.7, or 0.8, or 0.9, or 0.95, when determined according to the description provided in the *J. American Chemical Soc.,* 114, 1992, pp. 1025-1032, or an equivalent thereof.

In an embodiment according to the invention, propylene polymer produced using the instant catalyst comprise at least 50% vinyl or unsaturated chain ends. In an embodiment of the invention, at least 90%, or at least 95%, or at least 99% vinylidene chain ends.

In an embodiment according to the invention, the polyolefins produced using the instant catalyst may be isotactic, highly isotactic, syndiotactic, or highly syndiotactic propylene polymer. As used herein, "isotactic" is defined as having at least 10% isotactic pentads, preferably having at least 40% isotactic pentads of methyl groups derived from propylene according to analysis by $^{13}$C-NMR. As used herein, "highly isotactic" is defined as having at least 60% isotactic pentads according to analysis by $^{13}$C-NMR. In a desirable embodiment, the vinyl terminated polyolefin (preferably polypropylene) has at least 85% isotacticity. As used herein, "syndiotactic" is defined as having at least 10% syndiotactic pentads, preferably at least 40%, according to analysis by $^{13}$C-NMR. As used herein, "highly syndiotactic" is defined as having at least 60% syndiotactic pentads according to analysis by $^{13}$C-NMR. In an embodiment according to the invention, the vinyl terminated polyolefin (preferably polypropylene) has at least 85% syndiotacticity.

This invention relates to ethylene polymers having both vinyl termination and long chain branching, which in an embodiment according to the invention, are produced by the processes and using the catalyst disclosed herein. In an embodiment according to the invention, the process described herein produces ethylene homopolymers or ethylene copolymers, such as ethylene-alpha-olefin, or $C_3$ to $C_{20}$ copolymers such as ethylene-propylene copolymers, ethylene-hexene copolymers or ethylene-octene copolymers having:

a) at least 50% allyl chain ends, or least 60%, 70%, 80%, 90%, 95%, 98%, or 99%; and/or b) an Mn of at least 200 g/mol, measured by $^1$H NMR, or 250 g/mol to 100,000 g/mol, e.g., or 200 g/mol to 75,000 g/mol, e.g., or 200 g/mol to 60,000 g/mol, or 300 g/mol to 60,000 g/mol, or 750 g/mol to 30,000 g/mol); and/or c) at least 0.5 branches having 7 or more carbon atoms per 1000 carbon atoms, or 1.0 or more, or 1.25 or more, or 1.5 or more, or 1.75 or more, or 2.0 or more, or from 0.5 to 5.0, or from 1.0 to 4.0, or from 1.5 to 3.0; and/or d) a Tm of 100° C. or more, or 110° C. or more, or 120° C. or more; and/or e) a ratio of methyl chain ends, also referred to herein as saturated chain ends, to allyl chain ends of 1:1 to 5:1, or 1:1 to 4:1, or 1:1 to 3:1; and/or f) at least 50 wt % of the polymer, which may be an ethylene homopolymer or copolymer, has one vinyl per molecule or per chain as determined by $^1$H NMR, or at least 60 wt %, or at least 70 wt %, or at least 80 wt %, or at least 90 wt %, or at least 95 wt %; and/or essentially no diene is present, or the polymer comprises less than or equal to about 0.01 wt % diene; and/or g) the polymer comprises at least 50 mol % ethylene, or at least 60 mol %, or at least 70 mol %, or at least 75 mol %, or at least 80 mol %, or at least 85 mol %, or at least 90 mol %, or at least 95 mol %, or essentially 100 mol % ethylene; and/or h) an Mw/Mn of greater than 1 to 4, or greater than 1 to 3.

In an embodiment according to the invention, polymer produced herein has less than 1400 ppm aluminum, or less than 1200 ppm, or less than 1000 ppm, or less than 500 ppm, or less than 100 ppm as determined by ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, which is used herein for purposes of determining the amount of an element in a material; and/or in an embodiment according to the invention, the polymer has less than 1400 ppm of the Group 3, 4, 5, or 6 transition metal, or of the Group 4 transition metal, or of Ti, Zr, and/or Hf, or less than 1200 ppm or less than 1000 ppm, or less than 500 ppm, or less than 100 ppm, as determined by ICPES as discussed above.

In an embodiment according to the invention, an ethylene polymer according to the instant disclosure has less than 1400 ppm hafnium, or less than 1200 ppm, or less than 1000 ppm, or less than 500 ppm, or less than 100 ppm as determined by ICPES.

In an embodiment according to the invention, an ethylene polymer according to the instant disclosure has less than 1400 ppm zirconium, or less than 1200 ppm, or less than 1000 ppm, or less than 500 ppm, or less than 100 ppm as determined by ICPES.

In an embodiment according to the invention, the polymer produced herein, which may be an ethylene polymer, has a density of greater than 0.95 g/cc, or greater than 0.955 g/cc, or greater than 0.96 g/cc.

In an embodiment according to the invention, the ethylene polymer produced herein has a branching index (g'vis) of 0.9 or less, or 0.85 or less, or 0.80 or less, where g'vis is determined as described below.

For purposes herein, Mw, Mz number of carbon atoms, g value and $g'_{vis}$ are determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001) and references therein. Three Polymer Laboratories PLgel 10 mm Mixed-B LS columns are used. The nominal flow rate is 0.5 cm³/min, and the nominal injection volume is 300 µL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 µm glass pre-filter and subsequently through a 0.1 µm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm³, molecular weight is expressed in g/mole, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers and 0.1 otherwise, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'vis = \frac{[\eta]_{avg}}{k M_v^\alpha}$$

where, for purpose of this invention and claims thereto, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis.

Also called a "g value", "g" is defined to be $Rg^2_{pm}/Rg^2_{ls}$, where $Rg_{pm}$ is the radius of gyration for the polymacromer, $Rg^2_{ls}$ is the radius of gyration for the linear standard, and $Rg_{ls} = K_s M^{0.58}$ where $K_s$ is the power law coefficient (0.023 for linear polyethylene, 0.0171 for linear polypropylene, and 0.0145 for linear polybutene), and M is the molecular weight as described above, $Rg_{pm} = K_T M^{\alpha_s}$, $\alpha_s$ is the size coefficient for the polymacromer, $K_T$ is the power law coefficient for the polymacromer. See Macromolecules, 2001, 34, 6812-6820, for guidance on selecting a linear standards having the molecular weight and comonomer content, and determining K coefficients and α exponents.

In an embodiment of the invention, the instant catalyst is used to produce vinyl terminated polymers having unsaturated chain end or terminus. The unsaturated chain end of the vinyl terminated macromonomer comprises an "allyl chain end", a vinylidene chain end, or a "3-alkyl" chain end.

An allyl chain end is represented by $CH_2CH$—$CH_2$—, as shown in the formula:

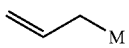

where M represents the polymer chain. "Allylic vinyl group," "allyl chain end," "vinyl chain end," "vinyl termination," "allylic vinyl group," and "vinyl terminated" are used interchangeably in the following description. The number of allyl chain ends, vinylidene chain ends, vinylene chain ends, and other unsaturated chain ends is determined using $^1$H NMR at 120° C. using deuterated tetrachloroethane as the solvent on an at least 250 MHz NMR spectrometer, and in selected cases, confirmed by $^{13}$C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a BRUKER spectrometer operating at 500 MHz for proton and 125 MHz for carbon) for vinyl terminated oligomers in *J. American Chemical Soc.*, 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

A vinylidene chain end is represented by the formula:

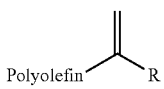

where R can be H, alkyl, aryl aralkyl, or alkaryl.

A 3-alkyl chain end (where the alkyl is a $C_1$ to $C_{38}$ alkyl), also referred to as a "3-alkyl vinyl end group" or a "3-alkyl vinyl termination", is represented by the formula:

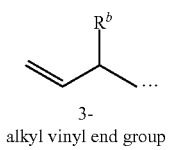

3-
alkyl vinyl end group where "••••" represents the polyolefin chain and $R^b$ is a $C_1$ to $C_{38}$ alkyl group, or a $C_1$ to $C_{20}$ alkyl group, such as methyl, ethyl, propyl, butyl, pentyl, hexyl, heptyl, octyl, nonyl, decyl, undecyl, dodecyl, and the like. The amount of 3-alkyl chain ends is determined using $^{13}$C NMR as set out below.

$^{13}$C NMR data may be collected at 120° C. at a frequency of at least 100 MHz, using a BRUKER 400 MHz NMR spectrometer. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra is acquired with time averaging to provide a signal to noise level adequate to measure the signals of interest. Samples are dissolved in tetrachloroethane-$d_2$ at concentrations between 10 wt % to 15 wt % prior to being inserted into the spectrometer magnet. Prior to data analysis spectra are referenced by setting the chemical shift of the TCE solvent signal to 74.39 ppm. Chain ends for quantization were identified using the signals shown in the table below. Unless otherwise indicated, n-butyl and n-propyl may not be reported if their abundance is less than 5% relative to the chain ends detected.

In the alternative, $^{13}$C NMR data may be collected at 120° C. in a 10 mm probe using a Varian spectrometer with a $^1$H frequency of at least 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired using time averaging to provide a signal to noise level adequate to measure the signals of interest. Samples were dissolved in tetrachloroethane-$d_2$ at concentrations between 10 to 15 wt % prior to being inserted into the spectrometer magnet. Prior to data analysis spectra were referenced by setting the chemical shift of the (—$CH_2$—)$_n$ signal where n>6 to 29.9 ppm. Chain ends for quantization were identified using the signals shown in the table below. N-butyl and n-propyl were not reported due to their low abundance (less than 5%) relative to the chain ends shown in the table below.

| Chain End | $^{13}$CNMR Chemical Shift |
| --- | --- |
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

The "allyl chain end to vinylidene chain end ratio" is defined to be the ratio of the percentage of allyl chain ends to the percentage of vinylidene chain ends.

The "allyl chain end to vinylene chain end ratio" is defined to be the ratio of the percentage of allyl chain ends to the percentage of vinylene chain ends.

Vinyl terminated polymers typically also have a saturated chain end, also referred to as a methyl end. In polymerizations comprising $C_4$ or greater monomers (or "higher olefin" monomers), the saturated chain end may be a $C_4$ or greater (or "higher olefin") chain end, as shown in the formula below:

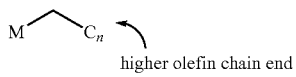
higher olefin chain end where M represents the polymer chain and n is an integer selected from 4 to 40. This is especially true when there is substantially no ethylene or propylene in the polymerization. In an ethylene/($C_4$ or greater monomer) copolymerization, the polymer chain may initiate growth in an ethylene monomer, thereby generating a saturated chain end which is an ethyl chain end. In polymerizations where propylene is present, the polymer chain may initiate growth in a propylene monomer, thereby generating an isobutyl chain end. An "isobutyl chain end" is defined to be an end or terminus of a polymer, represented as shown in the formula below:

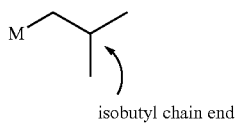
isobutyl chain end where M represents the polymer chain. Isobutyl chain ends are determined according to the procedure set out in WO 2009/155471. The "isobutyl chain end to allylic vinyl group ratio" is defined to be the ratio of the percentage of isobutyl chain ends to the percentage of allyl chain ends.

In an embodiment of the invention, the propylene polymer produced using the instant catalyst comprises at least 50% vinyl or unsaturated chain ends. In an embodiment of the invention, at least 90%, or at least 95%, or at least 99% vinylidene chain ends.

Mn ($^1$H NMR) may be determined according to the following NMR method. $^1$H NMR data is collected at either room temperature or 120° C. (for purposes of the claims, 120° C. shall be used) in a 5 mm probe using a Varian spectrometer with a $^1$H frequency of 250 MHz, 400 MHz, or 500 MHz (for the purpose of the claims, a proton frequency of 400 MHz is used). Data are recorded using a maximum pulse width of 45° C., 8 seconds between pulses and signal averaging 120 transients. Spectral signals are integrated and the number of unsaturation types per 1000 carbons are calculated by multiplying the different groups by 1000 and dividing the result by the total number of carbons. Mn is calculated by dividing the total number of unsaturated species into 14,000, and has units of g/mol. The chemical shift regions for the olefin types are defined to be between the following spectral regions.

| Unsaturation Type | Region (ppm) | Number of hydrogens per structure |
|---|---|---|
| Allylic Vinyl | 4.95-5.10 | 2 |
| Vinylidene | 4.70-4.84 | 2 |
| Disubstituted Vinylene | 5.31-5.55 | 2 |
| Trisubstituted Vinylene | 5.11-5.30 | 1 |

Differential Scanning Calorimetry (DSC)

Crystallization temperature ($T_c$), melting temperature (or melting point, $T_m$), glass transition temperature ($T_g$) and heat of fusion (Hf) are measured using Differential Scanning Calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Data are acquired by heating the sample to at least 30° C. above its melting temperature, typically 220° C. for polypropylene, at a heating rate of 10° C./min. The sample is held for at least 5 minutes at this temperature to destroy its thermal history. Then the sample is cooled from the melt to at least 50° C. below the crystallization temperature, typically −100° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures (Tm) reported are the peak melting temperatures from the second heat unless otherwise specified. For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Heat of melting (Hm) is determined using the DSC procedure above except that the sample is cooled to −100° C., held for 5 minutes then heated at 10° C./min to 200° C. Hm is measured on the first melt, no the second melt. The Hm sample must have been aged at least 48 hours at room temperature and should not be heated to destroy thermal history.

Ethylene Content

Ethylene content in ethylene copolymers is determined by ASTM D 5017-96, or an equivalent thereof, except that the minimum signal-to-noise should be 10,000:1. Propylene content in propylene copolymers is determined by following the approach of Method 1 in Di Martino and Kelchermans, *J. Appl. Polym. Sci.* 56, 1781 (1995), and using peak assignments from Zhang, *Polymer* 45, 2651 (2004) for higher olefin comonomers.

Mn, Mw, and Mz may also be measured by using a Gel Permeation Chromatography (GPC) method using a High Temperature Size Exclusion Chromatograph (SEC, either from Waters Corporation or Polymer Laboratories), equipped with a differential refractive index detector (DRI). Experimental details, are described in: T. Sun, P. Brant, R. R. Chance, and W. W. Graessley, *Macromolecules*, Volume 34, Number 19, pp. 6812-6820, (2001) and references therein. Three Polymer Laboratories PLgel 10 mm Mixed-B columns are used. The nominal flow rate is 0.5 cm$^3$/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 µm glass pre-filter and subsequently through a 0.1 µm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI} / (dn/dc)$$

where $K_{DRI}$ is a constant determined by calibrating the DRI, and $(dn/dc)$ is the refractive index increment for the system. The refractive index, n=1.500 for TCB at 135° C. and λ=690 nm. For purposes of this invention and the claims thereto $(dn/dc)=0.104$ for propylene polymers and ethylene polymers, and 0.1 otherwise. Units of parameters used throughout this description of the SEC method are: concentration is expressed in $g/cm^3$, molecular weight is expressed in g/mol, and intrinsic viscosity is expressed in dL/g.

Blends

In an embodiment according to the invention, the polymer (or the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In an embodiment according to the invention, the polymer (or the polyethylene or polypropylene) is present in the above blends, at from 10 to 99 wt %, based upon the weight of the polymers in the blend, or 20 to 95 wt %, or at least 30 to 90 wt %, or at least 40 to 90 wt %, or at least 50 to 90 wt %, or at least 60 to 90 wt %, or at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX 1010 or IRGANOX 1076 available from Ciba-Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

In an embodiment according to the invention, any of the foregoing polymers, such as the foregoing polypropylenes or blends thereof, may be used in a variety of end-use applications. Applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uniaxial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the machine direction (MD) at a ratio of up to 15, or between 5 and 7, and in the transverse direction (TD) at a ratio of up to 15, or 7 to 9. However, in an embodiment according to the invention, the film is oriented to the same extent in both the MD and TD directions.

The films may vary in thickness depending on the intended application; however, films of a thickness from 1 to 50 µm are usually suitable. Films intended for packaging are usually from 10 to 50 µm thick. The thickness of the sealing layer is typically 0.2 to 50 µm. There may be a sealing layer on both the inner and outer surfaces of the film or the sealing layer may be present on only the inner or the outer surface.

In an embodiment according to the invention, one or more layers may be modified by corona treatment, electron beam irradiation, gamma irradiation, flame treatment, or microwave. In an embodiment according to the invention, one or both of the surface layers is modified by corona treatment.
Molded Products The compositions described herein (or polypropylene compositions) may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the compositions described herein (or polypropylene compositions) may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring. Sheets are generally considered to have a thickness of from 254 μm to 2540 μm (10 mils to 100 mils), although any given sheet may be substantially thicker.
Non-Wovens and Fibers The polyolefin compositions described above may also be used to prepare nonwoven fabrics and fibers of this invention in any nonwoven fabric and fiber making process, including but not limited to, melt blowing, spunbonding, film aperturing, and staple fiber carding. A continuous filament process may also be used, or a spunbonding process may be used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.
Embodiments Accordingly, the instant disclosure relates to the following embodiments:

A. A process comprising: contacting one or more olefins with a catalyst system at a temperature, a pressure, and for a period of time sufficient to produce a polyolefin; the catalyst system comprising an activator and a catalyst compound disposed on a support.

B. The process of embodiment A, wherein the catalyst compound comprises a Salan catalyst compound.

C. The process of embodiment A or embodiment B wherein the catalyst compound comprises a compound according to Formula I, Formula I being represented by:

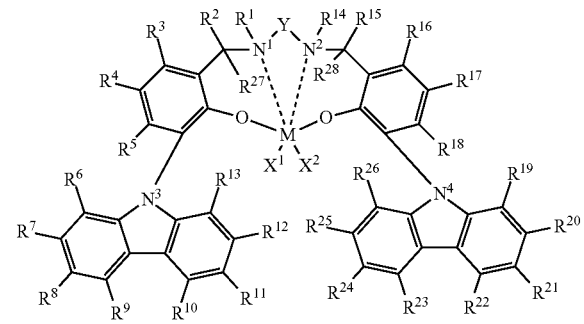

wherein each solid line represents a covalent bond and each dashed line represents a bond having varying degrees of covalency and a varying degree of coordination;

wherein M is a Group 3, 4, 5 or 6 transition metal;

$N^1$, $N^2$, $N^3$ and $N^4$ are nitrogen;

O is oxygen;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and Y is a divalent $C_1$ to $C_{20}$ hydrocarbyl.

D. The process of embodiment C, wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ of Formula I is a methyl radical, a fluoride, or a combination thereof.

E. The process of embodiment C or embodiment D, wherein:

M is Zr;

$X^1$ and $X^2$ are benzyl radicals;

$R^1$ and $R^{14}$ are methyl radicals;

$R^2$ through $R^{13}$ and $R^{15}$ through $R^{28}$ are hydrogen; and

Y is —$CH_2CH_2$—.

F. The process of embodiment C or embodiment D, wherein:
M is Zr;
$X^1$ and $X^2$ are benzyl radicals;
$R^1$, $R^4$, $R^{14}$ and $R^{17}$ are methyl radicals;
$R^2$, $R^3$, $R^5$ through $R^{13}$, $R^{15}$, $R^{16}$, $R^{18}$ through $R^{28}$ are hydrogen; and
Y is —$CH_2CH_2$—.

G. The process of embodiment C or embodiment D, wherein:
M is Zr;
$X^1$ and $X^2$ are benzyl radicals;
$R^1$ and $R^{14}$ are methyl radicals;
$R^4$ and $R^{17}$ are fluoro groups;
$R^2$, $R^3$, $R^5$ through $R^{13}$, $R^{15}$, $R^{16}$, $R^{18}$ through $R^{28}$ are hydrogen; and
Y is —$CH_2CH_2$—.

H. The process of embodiment C or embodiment D, wherein:
M is Zr;
$X^1$ and $X^2$ are benzyl radicals;
$R^1$, $R^4$, $R^{14}$ and $R^{17}$ are methyl radicals;
$R^8$, $R^{11}$, $R^{21}$ and $R^{24}$ are tert-butyl radicals;
$R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$ and $R^{26}$ through $R^{28}$ are hydrogen; and
Y is —$CH_2CH_2$—.

I. The process of embodiment C or embodiment D, wherein:
M is Zr;
$X^1$ and $X^2$ are benzyl radicals;
$R^1$, $R^4$, $R^{14}$ and $R^{17}$ are methyl radicals;
$R^8$, $R^{11}$, $R^{21}$ and $R^{24}$ are mesityl radicals;
$R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$ and $R^{26}$ through $R^{28}$ are hydrogen; and
Y is —$CH_2CH_2$—.

J. The process of any one of embodiments A to I wherein the catalyst compound comprises a compound according to Formula II, Formula II being represented by:

wherein each solid line represents a covalent bond and each dashed line represents a bond having varying degrees of covalency and a varying degree of coordination;
wherein M is a Group 3, 4, 5 or 6 transition metal;
$N^1$, $N^2$, and $N^3$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and
Y is a divalent $C_1$ to $C_{20}$ hydrocarbyl radical.

K. The process of embodiment J, wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ according to Formula II, is a methyl radical, a bromide, an adamantyl radical, or a combination thereof.

L. The process of embodiment J or embodiment K, wherein in the catalyst compound according to Formula II:
M is Zr;
$X^1$ and $X^2$ are benzyl radicals;
$R^1$ and $R^{14}$ are methyl radicals;
$R^2$ through $R^{13}$, $R^{15}$, $R^{16}$, $R^{18}$, $R^{20}$ and $R^{21}$ are hydrogen;
$R^{17}$ and $R^{19}$ are bromine; and
Y is —$CH_2CH_2$—.

M. The process of embodiment J or embodiment K, wherein in the catalyst compound according to Formula II:
M is Zr;
$X^1$ and $X^2$ are benzyl radicals;
$R^1$, $R^{14}$ and $R^{17}$ are methyl radicals;
$R^2$ through $R^{13}$, $R^{15}$, $R^{16}$, $R^{18}$, $R^{20}$, and $R^{21}$ are hydrogen;
$R^{19}$ is a 1-adamantyl radical; and
Y is —$CH_2CH_2$—.

N. The process of embodiment J or embodiment K, wherein in the catalyst compound according to Formula II:
M is Hf;
$X^1$ and $X^2$ are benzyl radicals;
$R^1$ and $R^{14}$ and $R^{17}$ are methyl radicals;
$R^2$ through $R^{13}$, $R^{15}$, $R^{16}$, $R^{18}$, $R^{20}$ and $R^{21}$ are hydrogen;
$R^{19}$ is a 1-adamantyl radical; and
Y is —$CH_2CH_2$—.

O. The process of any one of embodiments A to N wherein the catalyst compound comprises a compound according to Formula III, Formula III being represented by:

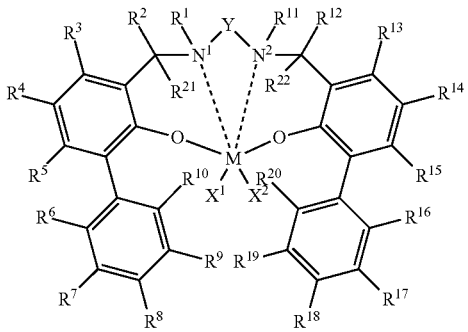

(III)

wherein each solid line represents a covalent bond and each dashed line represents a bond having varying degrees of covalency and a varying degree of coordination;

wherein M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof;

at least one of $R^6$, $R^7$, $R^8$, $R^9$, $R^{10}$, $R^{16}$, $R^{17}$, $R^{18}$, $R^{19}$, or $R^{20}$ comprise fluorine; and Y is a divalent $C_1$ to $C_{20}$ hydrocarbyl radical.

P. The process of embodiment O, wherein in the catalyst compound according to Formula III, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is a methyl radical, a fluoride, or a combination thereof.

Q. The process of embodiment O or embodiment P, wherein in the catalyst compound according to Formula III:
M is Ti;
$X^1$ and $X^2$ are benzyl radicals;
$R^1$ and $R^{11}$ are methyl radicals;
$R^2$, $R^3$, $R^5$, $R^{12}$, $R^{13}$, $R^{15}$, $R^{21}$ and $R^{22}$ are hydrogen;
$R^4$, $R^6$, $R^7$, $R^8$, $R^9$, $R^{10}$, $R^{14}$, $R^{16}$, $R^{17}$, $R^{18}$, $R^{19}$, and $R^{20}$ are fluorine; and
Y is —CH$_2$CH$_2$—.

R. The process of embodiment O or embodiment P, wherein in the catalyst compound according to Formula III:
M is Ti;
$X^1$ and $X^2$ are benzyl radicals;
$R^1$, $R^4$, $R^{11}$ and $R^{14}$ are methyl radicals;
$R^2$, $R^3$, $R^5$, $R^{12}$, $R^{13}$, $R^{15}$, $R^{21}$ and $R^{22}$ are hydrogen;
$R^6$, $R^7$, $R^8$, $R^9$, $R^{10}$, $R^{16}$, $R^{17}$, $R^{18}$, $R^{19}$, and $R^{20}$ are fluorine; and
Y is —CH$_2$CH$_2$—.

S. The process of embodiment O or embodiment P, wherein in the catalyst compound according to Formula III:
M is Zr;
$X^1$ and $X^2$ are benzyl radicals;
$R^1$ and $R^{11}$ are methyl radicals;
$R^2$, $R^3$, $R^5$, $R^{12}$, $R^{13}$, $R^{15}$, $R^{21}$ and $R^{22}$ are hydrogen;
$R^4$, $R^6$, $R^7$, $R^8$, $R^9$, $R^{10}$, $R^{14}$, $R^{16}$, $R^{17}$, $R^{18}$, $R^{19}$, and $R^{20}$ are fluorine; and
Y is —CH$_2$CH$_2$—.

T. The process of embodiment O or embodiment P, wherein in the catalyst compound according to Formula III:
M is Zr;
$X^1$ and $X^2$ are benzyl radicals;
$R^1$, $R^4$, $R^{11}$ and $R^{14}$ are methyl radicals;
$R^2$, $R^3$, $R^5$, $R^{12}$, $R^{13}$, $R^{15}$, $R^{21}$ and $R^{22}$ are hydrogen;
$R^6$, $R^7$, $R^8$, $R^9$, $R^{10}$, $R^{16}$, $R^{17}$, $R^{18}$, $R^{19}$, and $R^{20}$ are fluorine; and
Y is —CH$_2$CH$_2$—.

U. The process of any one of embodiments C to T, wherein two or more of $R^1$ to $R^{28}$ of Formula I if present, $R^1$ to $R^{21}$ of Formula II if present, $R^1$ to $R^{22}$ of Formula III if present, or a combination thereof, independently join together to form a $C_4$ to $C_{62}$ cyclic or polycyclic ring structure.

V. The process of any one of embodiments C to U, wherein M of Formula I if present, Formula II if present, Formula III if present, or a combination thereof is Hf, Ti, or Zr.

W. The process of any one of embodiments C to V, wherein each X of Formula I if present, Formula II if present, Formula III if present, or a combination thereof is, independently, a halogen or a $C_1$ to $C_7$ hydrocarbyl radical.

X. The process of any one of embodiments C to W, wherein each X of Formula I if present, Formula II if present, Formula III if present, or a combination thereof is a benzyl radical.

Y. The process of any one of embodiments C to X, wherein each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ of Formula I if present, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula II if present, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ of Formula III if present, or a combination thereof are, independently, hydrogen, a halogen, or a $C_1$ to $C_{30}$ hydrocarbyl radical.

Z. The process of any one of embodiments C to Y, wherein each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ of Formula I if present, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula II if present, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ of Formula III if present, or a combination thereof are, independently, hydrogen, a halogen, or a $C_1$ to C to hydrocarbyl radical.

A1. The process of any one of embodiments C to Z, wherein Y of Formula I if present, Formula II if present, Formula III if present, or a combination thereof is —CH$_2$CH$_2$— or 1,2-cyclohexylene.

B1. The process of any one of embodiments C to A1, wherein Y of Formula I if present, Formula II if present, Formula III if present, or a combination thereof is —$CH_2CH_2CH_2$—.

C1. The process of any one of embodiments C to B1, wherein Y of Formula I if present, Formula II if present, Formula III if present, or a combination thereof is a $C_1$-$C_{40}$ divalent hydrocarbyl radical comprising a linker backbone comprising from 1 to 18 carbon atoms bridging between nitrogen atoms $N^1$ and $N^2$.

D1. The process of any one of embodiments C to C1, wherein Y of Formula I if present, Formula II if present, Formula III if present, or a combination thereof is a $C_1$-$C_{40}$ divalent hydrocarbyl radical comprising O, S, S(O), $S(O)_2$, $Si(R')_2$, P(R'), N, N(R'), or a combination thereof, wherein each R' is independently a $C_1$-$C_{18}$ hydrocarbyl radical.

E1. The process of any one of embodiments A to D1, wherein the activator comprises alumoxane, an alkylalumoxane, or a combination thereof.

F1. The process of any one of embodiments A to E1, wherein the activator comprises alumoxane, methylalumoxane, or a combination thereof, and wherein the activator is present at a ratio of 1 mole aluminum or more to mole of catalyst compound.

G1. The process of any one of embodiments A to F1, wherein the activator comprises trimethylaluminum-depleted alkylalumoxane.

H1. The process of any one of embodiments A to G1, wherein the activator comprises trimethylaluminum-depleted methylalumoxane.

I1. The process of any one of embodiments A to H1, wherein the activator is methylalumoxane supported on an inorganic oxide comprising an element from Group 2, 4, 13, 14 of the periodic table, or a combination thereof.

J1. The process of any one of embodiments A to I1, wherein the activator is methylalumoxane supported on silica, alumina, magnesia, titania, zirconia, montmorillonite, phyllosilicate, zeolite, talc, clay, or a combination thereof.

K1. The process of any one of embodiments A to J1, wherein the activator is methylalumoxane supported on fumed silica.

L1. The process of any one of embodiments A to K1, wherein the activator, the catalyst compound, or a combination thereof is supported using incipient wetness.

M1. The process of any one of embodiments A to L1, wherein the activator, the catalyst compound, or a combination thereof is supported by contacting the activator, the catalyst compound, or both with a support to form a supported activator, supported catalyst, or a combination thereof, wherein the activator, the catalyst compound, or a combination thereof are deposited on, vaporized with, bonded to, incorporated within, adsorbed or absorbed in, or on, the support.

N1. The process of any one of embodiments A to L1, wherein the temperature is from about 0° C. to about 300° C., the pressure is from about 0.35 MPa to about 10 MPa, the time is from about 0.1 minutes to about 24 hours, or a combination thereof, and/or wherein the temperature is from about 50° C. to about 150° C.

O1. The polyolefin obtained by the process of any one of embodiments A to N1.

P1. A polyolefin comprising ethylene, wherein the polyolefin is produced by a process comprising:

contacting one or more olefins with a catalyst system at a temperature, a pressure, and for a period of time sufficient to produce a polyolefin, the catalyst system comprising an activator and a catalyst compound disposed on a support;

the catalyst compound according to Formula I, Formula II, Formula III, or a combination thereof:

Formula I being represented by:

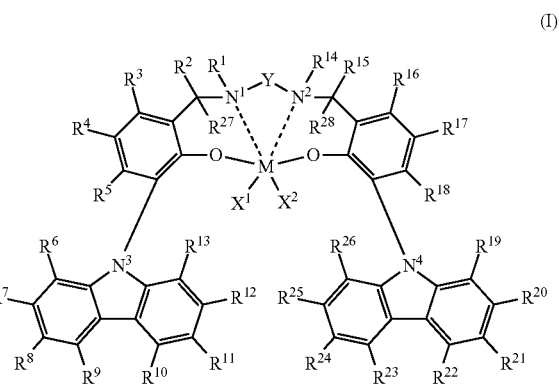

(I)

wherein each solid line represents a covalent bond and each dashed line represents a bond having varying degrees of covalency and a varying degree of coordination;

wherein M is a Group 3, 4, 5 or 6 transition metal;

$N^1$, $N^2$, $N^3$ and $N^4$ are nitrogen;

O is oxygen;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof; and Y is a divalent $C_1$ to $C_{20}$ hydrocarbyl;

Formula II being represented by:

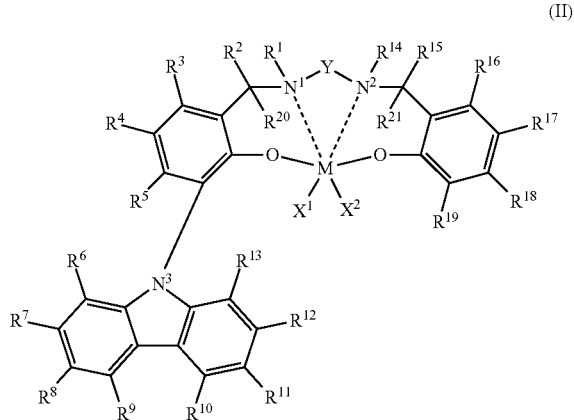

(II)

wherein each solid line represents a covalent bond and each dashed line represents a bond having varying degrees of covalency and a varying degree of coordination;
wherein M is a Group 3, 4, 5 or 6 transition metal; $N^1$, $N^2$, and $N^3$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and
Y is a divalent $C_1$ to $C_{20}$ hydrocarbyl radical;
Formula III being represented by:

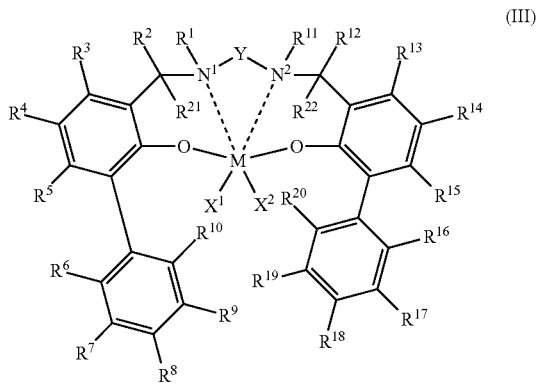

wherein each solid line represents a covalent bond and each dashed line represents a bond having varying degrees of covalency and a varying degree of coordination;
wherein M is a Group 3, 4, 5 or 6 transition metal; $N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^1$ to $R^{22}$ may independently join together to form a $C_4$ to $C_{62}$ cyclic or polycyclic ring structure, or a combination thereof;
at least one of $R^6$, $R^7$, $R^8$, $R^9$, $R^{10}$, $R^{16}$, $R^{17}$, $R^{18}$, $R^{19}$, or $R^{20}$ comprise fluorine; and
Y is a divalent $C_1$ to $C_{20}$ hydrocarbyl radical.

Q1. The polyolefin of embodiment O1 or embodiment P1, wherein the polyolefin comprises a vinyl content of at least 50%, based upon total unsaturation, as determined by $^1$H NMR.
R1. The polyolefin of any one of embodiments O1 to Q1, wherein the polyolefin comprises at least 80% vinyl termination as determined by $^1$H NMR.
S1. The polyolefin of any one of embodiments O1 to R1, comprising at least 50 mole % ethylene.
T1. The polyolefin of any one of embodiments O1 to R1, comprising at least 75 mole % ethylene.
U1. The polyolefin of any one of embodiments O1 to R1, comprising at least 99.9 mole % ethylene.
V1. The polyolefin of any one of embodiments O1 to U1, comprising:
  a) a ratio of saturated chain ends to allyl chain ends of greater than 1:1;
  b) a ratio of vinyl groups per molecule as determined by $^{13}$C NMR of at least 50%; and
  c) an Mn of at least 250 g/mol as determined by $^1$H NMR; or a combination thereof.
W1. The polyolefin of any one of embodiments O1 to V1, comprising an Mn of 250 g/mol to 100,000 g/mol.
X1. The polyolefin of any one of embodiments O1 to W1, further comprising propylene.
Y1. A catalyst system comprising an activator and a catalyst compound disposed on a support, according to Formula I, Formula II, Formula III, or a combination thereof;
Formula I being represented by:

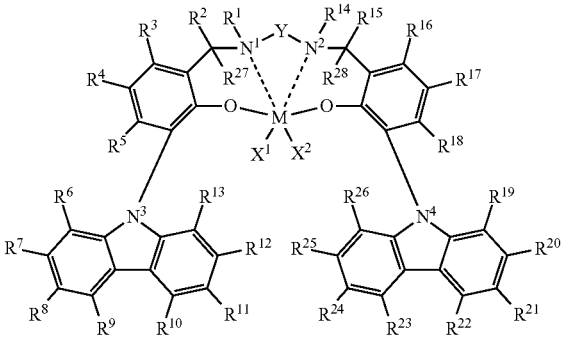

wherein each solid line represents a covalent bond and each dashed line represents a bond having varying degrees of covalency and a varying degree of coordination;
M is a Group 3, 4, 5 or 6 transition metal; $N^1$, $N^2$, $N^3$ and $N^4$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof, or a combination thereof; and Y is a divalent $C_1$ to $C_{20}$ hydrocarbyl;

Formula II being represented by:

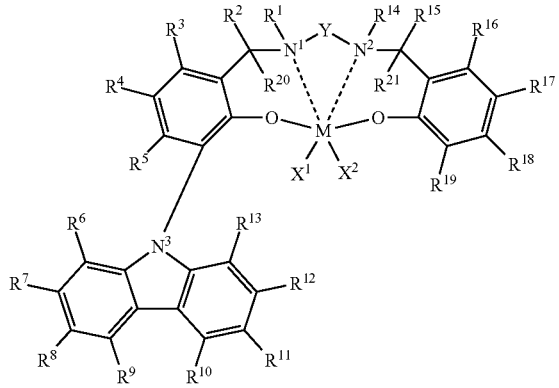

wherein each solid line represents a covalent bond and each dashed line represents a bond having varying degrees of covalency and a varying degree of coordination;

M is a Group 3, 4, 5 or 6 transition metal;

$N^1$, $N^2$, and $N^3$ are nitrogen;

O is oxygen;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and Y is a divalent $C_1$ to $C_{20}$ hydrocarbyl radical;

Formula III being represented by:

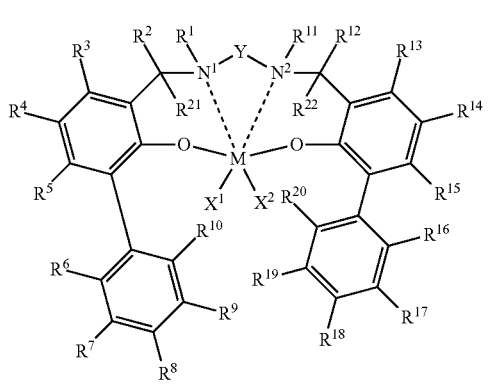

wherein each solid line represents a covalent bond and each dashed line represents a bond having varying degrees of covalency and a varying degree of coordination;

M is a Group 3, 4, 5 or 6 transition metal;

$N^1$ and $N^2$ are nitrogen;

O is oxygen;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure, provided however when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof;

at least one of $R^6$, $R^7$, $R^8$, $R^9$, $R^{10}$, $R^{16}$, $R^{17}$, $R^{18}$, $R^{19}$, or $R^{20}$ comprise fluorine; and Y is a divalent $C_1$ to $C_{20}$ hydrocarbyl radical.

Z1. The catalyst system of embodiment Y1, wherein two or more of $R^1$ to $R^{28}$ of Formula I, $R^1$ to $R^{21}$ of Formula II, $R^1$ to $R^{22}$ of Formula III, or a combination thereof, independently join together to form a $C_4$ to $C_{62}$ cyclic or polycyclic ring structure.

A2. The catalyst system according to any one of embodiments Y1 or Z1, wherein M of Formula I, Formula II, Formula III, or a combination thereof is Hf, Ti, or Zr.

B2. The catalyst system according to any one of embodiments Y1 to A2, wherein each X of Formula I, Formula II, Formula III, or a combination thereof is, independently, a halogen or a $C_1$ to $C_7$ hydrocarbyl radical.

C2. The catalyst system according to any one of embodiments Y1 to B2, wherein each X of Formula I, Formula II, Formula III, or a combination thereof is a benzyl radical.

D2. The catalyst system according to any one of embodiments Y1 to C2, wherein each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$ and $R^{28}$ of Formula (I), each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula (II), $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ of Formula (III), or a combination thereof are, independently, hydrogen, a halogen, or a $C_1$ to $C_{30}$ hydrocarbyl radical.

E2. The catalyst system according to any one of embodiments Y1 to D2, wherein each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$ and $R^{28}$ of Formula (I), each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ of Formula (II), $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ of Formula (III), or a combination thereof are, independently, hydrogen, a halogen, or a $C_1$ to $C_{10}$ hydrocarbyl radical.

F2. The catalyst system according to any one of embodiments Y1 to E2, wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ $R^{24}$, $R^{25}$, $R^{26}$, $R^{27}$, and $R^{28}$ of Formula I is a methyl radical, a fluoride, or a combination thereof.

G2. The catalyst system according to any one of embodiments Y1 to F2, wherein the catalyst compound is according to Formula I, wherein:
M is Zr;
$X^1$ and $X^2$ are benzyl radicals;
$R^1$ and $R^{14}$ are methyl radicals;
$R^2$ through $R^{13}$ and $R^{15}$ through $R^{28}$ are hydrogen; and
Y is —CH$_2$CH$_2$—.

H2. The catalyst system according to any one of embodiments Y1 to G2, wherein the catalyst compound is according to Formula I, wherein:
M is Zr;
$X^1$ and $X^2$ are benzyl radicals;
$R^1$, $R^4$, $R^{14}$ and $R^{17}$ are methyl radicals;
$R^2$, $R^3$, $R^5$ through $R^{13}$, $R^{15}$, $R^{16}$, $R^{18}$ through $R^{28}$ are hydrogen; and
Y is —CH$_2$CH$_2$—.

I2. The catalyst system according to any one of embodiments Y1 to H2, wherein the catalyst compound is according to Formula I, wherein:
M is Zr;
$X^1$ and $X^2$ are benzyl radicals;
$R^1$ and $R^{14}$ are methyl radicals;
$R^4$ and $R^{17}$ are fluoro groups;
$R^2$, $R^3$, $R^5$ through $R^{13}$, $R^{15}$, $R^{16}$, $R^{18}$ through $R^{28}$ are hydrogen; and
Y is —CH$_2$CH$_2$—.

J2. The catalyst system according to any one of embodiments Y1 to I2, wherein the catalyst compound is according to Formula I, wherein:
M is Zr;
$X^1$ and $X^2$ are benzyl radicals;
$R^1$, $R^4$, $R^{14}$ and $R^{17}$ are methyl radicals;
$R^8$, $R^{11}$, $R^{21}$ and $R^{24}$ are tert-butyl radicals;
$R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$ and $R^{26}$ through $R^{28}$ are hydrogen; and
Y is —CH$_2$CH$_2$—.

K2. The catalyst system according to any one of embodiments Y1 to J2, wherein the catalyst compound is according to Formula I, wherein:
M is Zr;
$X^1$ and $X^2$ are benzyl radicals;
$R^1$, $R^4$, $R^{14}$ and $R^{17}$ are methyl radicals;
$R^8$, $R^{11}$, $R^{21}$ and $R^{24}$ are mesityl radicals;
$R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$ and $R^{26}$ through $R^{28}$ are hydrogen; and
Y is —CH$_2$CH$_2$—.

L2. The catalyst system according to any one of embodiments Y1 to K2, wherein the catalyst compound is according to Formula II, wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is a methyl radical, a bromide, an adamantyl radical, or a combination thereof.

M2. The catalyst system according to any one of embodiments Y1 to L2, wherein the catalyst compound is according to Formula II, wherein:
M is Zr;
$X^1$ and $X^2$ are benzyl radicals;
$R^1$ and $R^{14}$ are methyl radicals;
$R^2$ through $R^{13}$, $R^{15}$, $R^{16}$, $R^{18}$, $R^{20}$ and $R^{21}$ are hydrogen;
$R^{17}$ and $R^{19}$ are bromine; and
Y is —CH$_2$CH$_2$—.

N2. The catalyst system according to any one of embodiments Y1 to M2, wherein the catalyst compound is according to Formula II, wherein:
M is Zr;
$X^1$ and $X^2$ are benzyl radicals;
$R^1$, $R^{14}$ and $R^{17}$ are methyl radicals;
$R^2$ through $R^{13}$, $R^{15}$, $R^{16}$, $R^{18}$, $R^{20}$, and $R^{21}$ are hydrogen;
$R^{19}$ is a 1-adamantyl radical; and
Y is —CH$_2$CH$_2$—.

O2. The catalyst system according to any one of embodiments Y1 to N2, wherein the catalyst compound is according to Formula II, wherein:
M is Hf;
$X^1$ and $X^2$ are benzyl radicals;
$R^1$ and $R^{14}$ and $R^{17}$ are methyl radicals;
$R^2$ through $R^{13}$, $R^{15}$, $R^{16}$, $R^{18}$, $R^{20}$ and $R^{21}$ are hydrogen;
$R^{19}$ is a 1-adamantyl radical; and
Y is —CH$_2$CH$_2$—.

P2. The catalyst system according to any one of embodiments Y1 to O2, wherein the catalyst compound is according to Formula III, wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is a methyl radical, a fluoride, or a combination thereof.

Q2. The catalyst system according to any one of embodiments Y1 to P2, wherein the catalyst compound is according to Formula III, wherein:
M is Ti;
$X^1$ and $X^2$ are benzyl radicals;
$R^1$ and $R^{11}$ are methyl radicals;
$R^2$, $R^3$, $R^5$, $R^{12}$, $R^{13}$, $R^{15}$, $R^{21}$ and $R^{22}$ are hydrogen;
$R^4$, $R^6$, $R^7$, $R^8$, $R^9$, $R^{10}$, $R^{14}$, $R^{16}$, $R^{17}$, $R^{18}$, $R^{19}$, and $R^{20}$ are fluorine; and
Y is —CH$_2$CH$_2$—.

R2. The catalyst system according to any one of embodiments Y1 to Q2, wherein the catalyst compound is according to Formula III, wherein:
M is Ti;
$X^1$ and $X^2$ are benzyl radicals;
$R^1$, $R^4$, $R^{11}$ and $R^{14}$ are methyl radicals;
$R^2$, $R^3$, $R^5$, $R^{12}$, $R^{13}$, $R^{15}$, $R^{21}$ and $R^{22}$ are hydrogen;
$R^6$, $R^7$, $R^8$, $R^9$, $R^{10}$, $R^{16}$, $R^{17}$, $R^{18}$, $R^{19}$, and $R^{20}$ are fluorine; and
Y is —CH$_2$CH$_2$—.

S2. The catalyst system according to any one of embodiments Y1 to R2, wherein the catalyst compound is according to Formula III, wherein:
M is Zr;
$X^1$ and $X^2$ are benzyl radicals;
$R^1$ and $R^{11}$ are methyl radicals;
$R^2$, $R^3$, $R^5$, $R^{12}$, $R^{13}$, $R^{15}$, $R^{21}$ and $R^{22}$ are hydrogen;
$R^4$, $R^6$, $R^7$, $R^8$, $R^9$, $R^{10}$, $R^{14}$, $R^{16}$, $R^{17}$, $R^{18}$, $R^{19}$, and $R^{20}$ are fluorine; and
Y is —CH$_2$CH$_2$—.

T2. The catalyst system according to any one of embodiments Y1 to S2, wherein the catalyst compound is according to Formula III, wherein:
M is Zr;
$X^1$ and $X^2$ are benzyl radicals;
$R^1$, $R^4$, $R^{11}$ and $R^{14}$ are methyl radicals;
$R^2$, $R^3$, $R^5$, $R^{12}$, $R^{13}$, $R^{15}$, $R^{21}$ and $R^{22}$ are hydrogen;
$R^6$, $R^7$, $R^8$, $R^9$, $R^{10}$, $R^{16}$, $R^{17}$, $R^{18}$, $R^{19}$, and $R^{20}$ are fluorine; and
Y is —CH$_2$CH$_2$—.

U2. The catalyst system according to any one of embodiments Y1 to T2, wherein Y of Formula I, Formula II, Formula III, or a combination thereof is —CH$_2$CH$_2$— or 1,2-cyclohexylene.

V2. The catalyst system according to any one of embodiments Y1 to U2, wherein Y of Formula I, Formula II, Formula III, or a combination thereof is —CH$_2$CH$_2$CH$_2$—.

W2. The catalyst system according to any one of embodiments Y1 to V2, wherein Y of Formula I, Formula II, Formula III, or a combination thereof is a C$_1$-C$_{40}$ divalent hydrocarbyl radical comprising a linker backbone comprising from 1 to 18 carbon atoms bridging between nitrogen atoms N$^1$ and N$^2$.

X2. The catalyst system according to any one of embodiments Y1 to W2, wherein Y of Formula I, Formula II, Formula III, or a combination thereof is a C$_1$-C$_{40}$ divalent hydrocarbyl radical comprising O, S, S(O), S(O)$_2$, Si(R')$_2$, P(R'), N, N(R'), or a combination thereof, wherein each R' is independently a C$_1$-C$_{18}$ is hydrocarbyl radical.

Y2. The catalyst system according to any one of embodiments Y1 to X2, wherein the activator comprises alumoxane, an alkylalumoxane, or a combination thereof.

Z2. The catalyst system according to any one of embodiments Y1 to Y2, wherein the activator comprises alumoxane, methylalumoxane, or a combination thereof, and wherein the activator is present at a ratio of 1 mole aluminum or more to mole of catalyst compound.

A3. The catalyst system according to any one of embodiments Y1 to Z2, wherein the activator comprises trimethylaluminum-depleted alkylalumoxane.

B3. The catalyst system according to any one of embodiments Y1 to A3, wherein the activator comprises trimethylaluminum-depleted methylalumoxane.

C3. The catalyst system according to any one of embodiments Y1 to B3, wherein the activator is methylalumoxane supported on an inorganic oxide comprising an element from Group 2, 4, 13, 14 of the periodic table, or a combination thereof.

D3. The catalyst system according to any one of embodiments Y1 to C3, wherein the activator is methylalumoxane supported on silica, alumina, magnesia, titania, zirconia, montmorillonite, phyllosilicate, zeolite, talc, clay, or a combination thereof.

E3. The catalyst system according to any one of embodiments Y1 to D3, wherein the activator is methylalumoxane supported on fumed silica.

F3. The catalyst system according to any one of embodiments Y1 to E3, wherein the activator, the catalyst compound, or a combination thereof is supported using incipient wetness.

G3. The catalyst system according to any one of embodiments Y1 to F3, wherein the activator, the catalyst compound, or a combination thereof is supported by contacting the activator, the catalyst compound, or both with a support to form a supported activator, supported catalyst, or a combination thereof, wherein the activator, the catalyst compound, or a combination thereof are deposited on, vaporized with, bonded to, incorporated within, adsorbed or absorbed in, or on, the support.

EXAMPLES

The foregoing discussion can be further described with reference to the following non-limiting examples. Four illustrative catalyst compounds (A, B, C and D), each according to one or more embodiments described, were synthesized and some were used to polymerize olefins. All reactions were carried out under a purified nitrogen atmosphere using standard glovebox, high vacuum or Schlenk techniques, unless otherwise noted. All solvents used were anhydrous, de-oxygenated and purified according to known procedures. All starting materials were either purchased from Aldrich and purified prior to use or prepared according to procedures known to those skilled in the art.

Synthesis of Compounds A-D

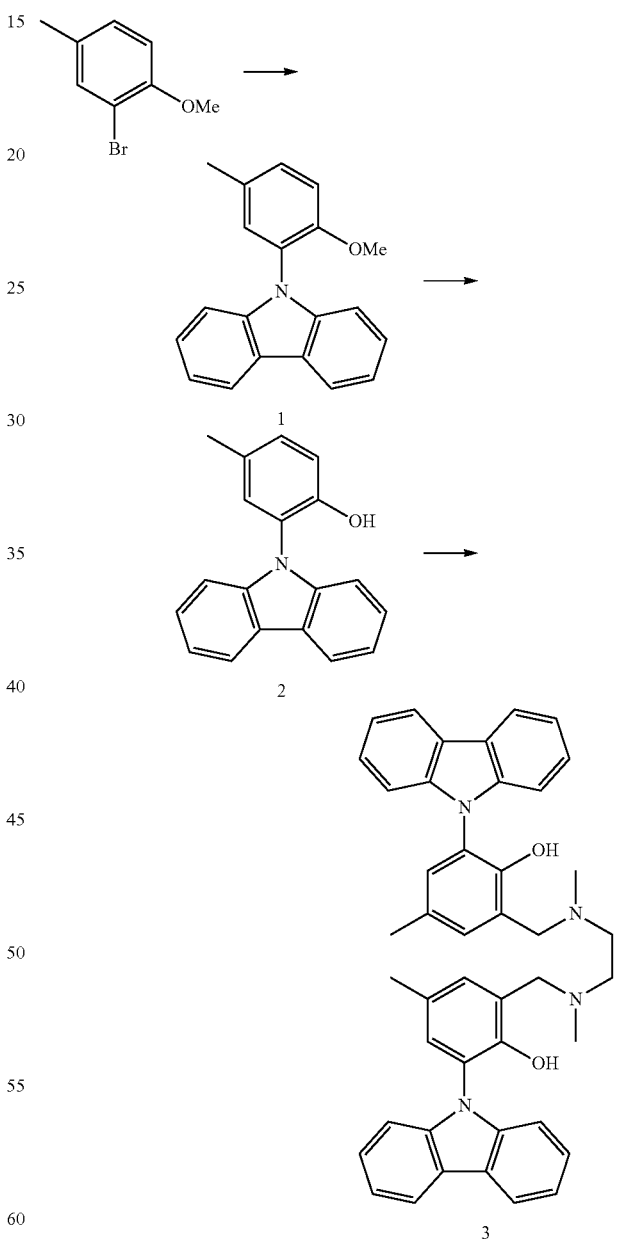

9-(2-Methoxy-5-methylphenyl)-9H-carbazole (1)

2-Bromo-4-methylanisole (20.11 g, 100 mmol, 1 equiv) and carbazole (20.06 g, 120 mmol, 1.2 equiv) were dissolved in 1,4-dioxane (400 mL). Potassium phosphate tribasic (37.15 g, 175 mmol, 1.75 equiv), copper (I) iodide (0.95 g, 5 mmol, 0.05 equiv) and racemic trans-1,2-diaminocyclohexane (2.4 mL, 20 mmol, 0.2 equiv) were added and the reaction was refluxed for two days. The reaction was cooled to room temperature, then partitioned with ethyl acetate (200 mL) and water (300 mL). The aqueous layer was extracted with ethyl acetate (3×200 mL). The combined organic layers were washed with saturated brine, dried over sodium sulfate, filtered, and concentrated under reduced pressure. The residue was purified over silica gel (150 g), eluting with 3% ethyl acetate in heptanes to give compound 1 (13.5 g, 45% yield) as a yellow solid.

2-(9H-Carbazol-9-yl)-4-methylphenol (2)

A 1.0 m boron tribromide solution in dichloromethane (90 mL, 90 mmol, 1.9 equiv) was added drop wise at −78° C., over 30 minutes, to a solution of compound 1 (13.5 g, 46.98 mmol, 1 equiv) in anhydrous dichloromethane (400 mL). The reaction was warmed to room temperature, when liquid chromatography-mass spectrometry (LCMS) indicated that the reaction was complete. The reaction was quenched with ice-water (200 mL). The layers were separated and the aqueous phase was extracted with dichloromethane (2×100 mL). The combined organic layers were dried over sodium sulfate, filtered, and concentrated under reduced pressure. The residue was purified on an ANALOGIX 40-150 g column, eluting with a gradient of 0 to 20% ethyl acetate in heptanes to give compound 2 (12.3 g, 95% yield) as a yellow oil.

6,6'-((Ethane-1,2-diylbis(methylazanediyl))bis(methylene))bis(2-(9H-carbazol-9-yl)-4-methylphenol) (3)

A mixture of compound 2 (3.4 g, 12.44 mmol, 2 equiv), paraformaldehyde (1.87 g, 62.2 mmol, 10 equiv), N,N'-dimethylethylenediamine (0.67 mL, 6.22 mmol, 1 equiv) and anhydrous ethanol (100 mL) was refluxed for 18 hours. The reaction was cooled to room temperature, and then concentrated under reduced pressure. The residue was purified on an ANALOGIX 25-60 g column, eluting with a gradient of 0 to 30% ethyl acetate in heptanes to give compound 3 (1.1 g, 27% yield) as a white solid.

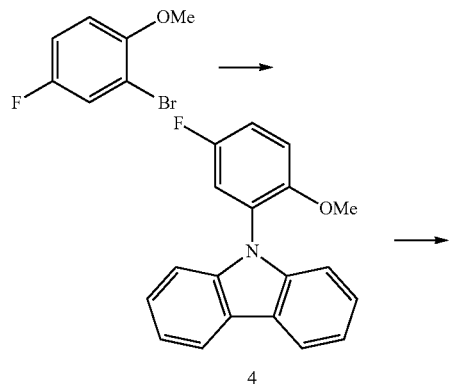

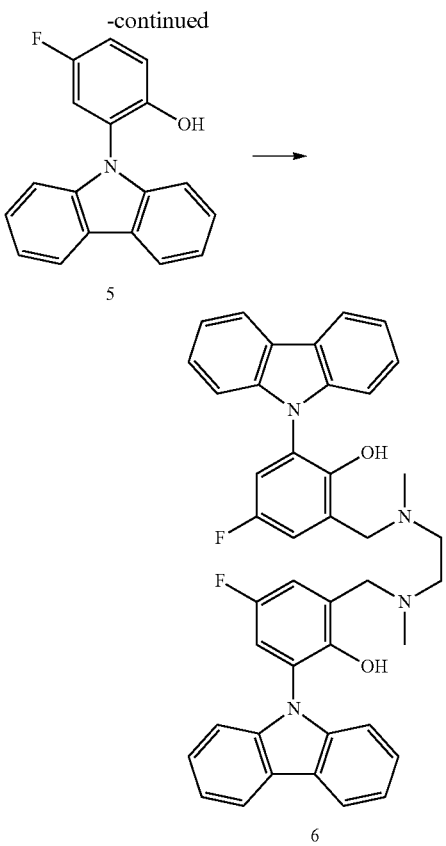

9-(5-Fluoro-2-methoxyphenyl)-9H-carbazole (4)

2-Bromo-4-fluoroanisole (20 g, 10 mmol, 1 equiv) and carbazole (18.4 g, 11 mmol, 1.1 equiv) were dissolved in 1,4-dioxane (200 mL). Potassium phosphate tribasic hydrate (46 g, 20 mmol, 2 equiv), copper(I) iodide (1 g, 0.5 mmol, 0.05 equiv) and 1,2-diaminopropane (1 mL, 1.3 mmol, 0.13 equiv) were added and the reaction was refluxed for 18 hours. The reaction was cooled to room temperature and filtered through CELITE diatomaceous earth. The filtrate was concentrated under reduced pressure and the residue was purified over silica gel (250 g), eluting with gradient of 0 to 10% ethyl acetate in heptanes to give compound 4 (7.6 g, 26% yield) as an off white solid that was contaminated with carbazole. This material was used subsequently.

2-(9H-Carbazol-9-yl)-4-fluorophenol (5)

A 1.0 M boron tribromide solution in dichloro-methane (60 mL, 60 mmol, 3 equiv) was added drop wise over 30 minutes at −78° C. to a solution of compound 4 (5.8 g, 20 mmol, 1 equiv) in dichloromethane (60 mL). The reaction was stirred at −78° C. for 4 hours, when $^1$H-NMR indicated that the reaction was complete. The reaction was poured into saturated sodium bicarbonate (100 mL) and the pH adjusted to 8 with 10% sodium hydroxide. The layers were separated and the aqueous phase was extracted with dichloro-methane (3×20 mL). The combined organic layers were dried over sodium sulfate, filtered, and concentrated under reduced pressure. The residue was purified over silica gel (100 g), eluting with a gradient of 60 to 100% dichloromethane in heptanes. The product containing fractions were combined, concentrated under reduced pressure and triturated with 20% methyl tert-butyl ether in heptanes (10 mL) to give compound 5 (4.3 g, 78% yield) as a white solid.

6,6'-((Ethane-1,2-diylbis(methylazanediyl))bis(methylene))bis(2-(9H-carbazol-9-yl)-4-fluorophenol) (6)

A mixture of compound 5 (1.5 g, 5.4 mmol, 2 equiv), paraformaldehyde (716 mg, 5.4 mmol, 2 equiv), N,N'-dimethylethylenediamine (300 μL, 2.7 mmol, 1 equiv) and anhydrous ethanol (20 mL) was refluxed for 18 hours (reaction was 60% complete after 2 hours). The reaction was cooled to room temperature, then concentrated under reduced pressure. The residue was purified over silica gel (50 g), eluting with a gradient of 60 to 100% dichloromethane in heptanes to give compound 6 (640 mg, 34% yield) as a white solid.

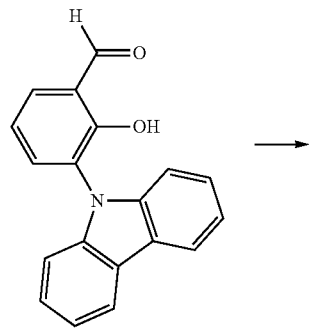

5

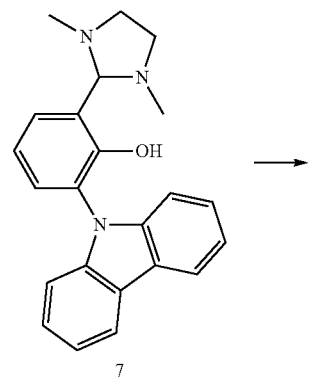

7

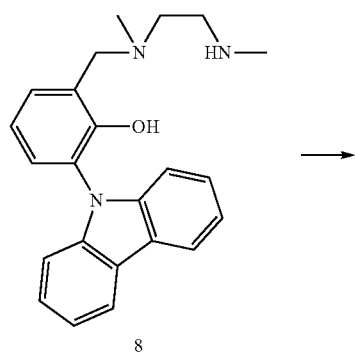

8

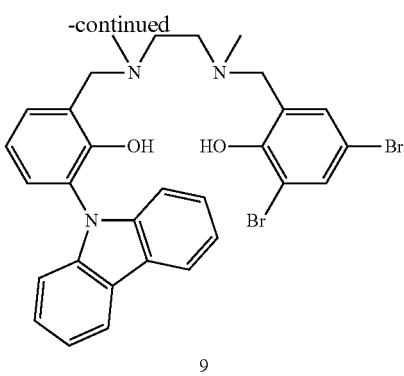

9

2-(9H-carbazol-9-yl)-6-(1,3-dimethylimidazolidin-2-yl)phenol (7)

In a 100 mL round bottom flask, 2-(9H-carbazol-9-yl) salicylaldehyde (0.573 g, 2.06 mmol) was dissolved in 30 mL of methanol and heated to 50° C. Ethylenediamine (0.176 g, 2.00 mmol) was also dissolved in 10 mL of methanol. When all of the 2-(9H-carbazol-9-yl)salicylaldehyde was dissolved, the solution of ethylene diamine was slowly added. After two hours, the flask was removed from the heat source and allowed to cool overnight. A precipitate was collected and used in the next step without further purification.

2-(9H-carbazol-9-yl)-6-((methyl(2-(methylamino)ethyl)amino)methyl)phenol (8)

A slurry of 7 from the previous synthesis was stirred at room temperature in a 100 mL round bottom flask. Sodium borohydride (0.640 g, 16.9 mmol) was added in small portions over 30 minutes. Gas evolution was observed. After three hours, the methanol was removed under vacuum and water was added. The resulting solids were filtered and washed with cold methanol. The white solids were dried under vacuum to yield 8 (0.585 g, 79% yield).

2-(((2-((3-(9H-carbazol-9-yl)-2-hydroxybenzyl)(methyl)amino)ethyl)(methyl)-amino)methyl)-4,6-dibromophenol (9)

8 (0.218 g, 0.606 mmol) and 2-bromomethyl-4,6-dibromophenol (0.209 g, 0.606 mmol) were dissolved in 20 mL of THF. Triethylamine (1.2 mL, 8.61 mmol) was added to the slightly pink solution. A white precipitate formed immediately. The reaction was allowed to stir overnight after which time the volatiles were removed and methanol added to make a slurry. The solids were filtered and dried under vacuum resulting in a white solid (0.215 g, 57% yield).

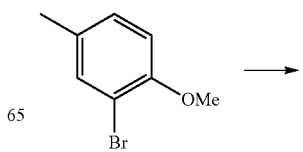

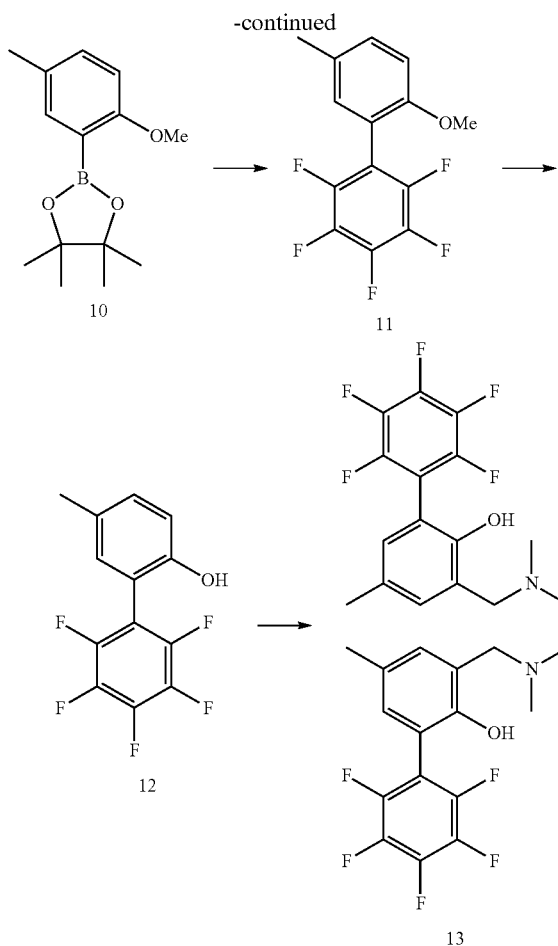

2-(2-Methoxy-5-methylphenyl)-4,4,5,5-tetramethyl-1,3,2-dioxaborolane (10)

To a solution of 2-bromo-4-methylanisole (10 g, 50 mmol, 1 equiv) in 1,4-dioxane (300 mL) was added bis(pinacolato)diboron (14 g, 55 mmol, 1.1 equiv), potassium acetate (17.2 g, 175 mmol, 3.5 equiv) and 1,1'-bis(diphenylphosphino)ferrocene (DPPF, 1.39 g, 2.5 mmol, 0.05 equiv) at room temperature. The resulting mixture was sparged with nitrogen for 10 minutes. 1,1'-Bis(diphenylphosphino)ferrocenedichloropalladium DCM adduct (1.92 g, 2.5 mmol, 0.05 equiv) was added and the resulting mixture was sparged with nitrogen for additional 5 minutes. The mixture was refluxed overnight. After the mixture was cooled to room temperature, diluted with ethyl acetate (300 mL) and washed by water (200 mL). The aqueous layer was extracted with ethyl acetate (2×200 mL). The combined organic layers were washed with saturated brine, dried over sodium sulfate, filtered, and concentrated under reduced pressure. The residue was purified over silica gel (500 g), eluting with a gradient of 0 to 15% ethyl acetate in heptanes to give 2-(2-methoxy-5-methylphenyl)-4,4,5,5-tetramethyl-1,3,2-dioxaborolane (10) (11.3 g, 91% yield) as yellow solid.

2,3,4,5,6-Pentafluoro-2'-methoxy-5'-methyl-1,1'-biphenyl (11)

Compound 10 (11.3 g, 45.54 mmol, 1 equiv) and iodopentafluorobenzene (10.6 g, 36.2 mmol, 1 equiv) were dissolved in toluene (200 mL) and 1.0M potassium carbonate solution (200 mL). Tetrabutylammonium bromide (1.6 g, 5 mmol, 0.11 equiv) was added and the solution sparged with nitrogen for 10 minutes. Tetrakis(triphenylphosphine)palladium(0) (2.63 g, 2.28 mmol, 0.05 equiv) was added and the reaction was refluxed for one day. The reaction was cooled to room temperature, then the layers were separated. The aqueous phase was back extracted with ethyl acetate (2×200 mL). Combined organic phases were combined, dried over sodium sulfate and concentrated under reduced pressure. The residue was purified over silica gel (200 g), eluting with heptanes to give 2,3,4,5,6-pentafluoro-2'-methoxy-5'-methyl-1,1'-biphenyl (11) (9.7 g, 74% yield) as a pale-yellow oil. This material contained a small amount of unreacted iodopentafluorobenzene which was identified by $^{19}$F NMR. The material was used subsequently.

2',3',4',5',6'-Pentafluoro-5-methyl-[1,1'-biphenyl]-2-ol (12)

A 1.0 M boron tribromide solution in dichloromethane (67.3 mL, 67.3 mmol, 2 equiv) was added drop wise, at −78° C., over 30 minutes to a solution of compound 11 (9.7 g, 33.65 mmol, 1 equiv) in anhydrous dichloro-methane (300 mL). The reaction was warmed to room temperature, when LCMS indicated that the reaction was complete. The reaction was quenched with ice-water (200 mL). The layers were separated and the aqueous phase was extracted with dichloromethane (2×100 mL). The combined organic layers were dried over sodium sulfate, filtered, and concentrated under reduced pressure. The residue was purified on an AnaLogix 65-200 g column, eluting with a gradient of 0 to 20% ethyl acetate in heptanes to give 2',3',4',5',6'-pentafluoro-5-methyl-[1,1'-biphenyl]-2-ol (12) (8.15 g, 88% yield) as a light-brown oil.

3,3''-((Ethane-1,2-diylbis(methylazanediyl))bis(methylene))bis(2',3',4',5',6'-pentafluoro-5-methyl-[1,1'-biphenyl]-2-ol) (13)

A mixture of compound 12 (8.15 g, 29.7 mmol, 2 equiv), paraformaldehyde (4.46 g, 148.5 mmol, 10 equiv), N,N'-dimethylethylenediamine (1.6 mL, 14.85 mmol, 1 equiv) and anhydrous ethanol (100 mL) was refluxed for 2 hours. LCMS indicated that the reaction was complete. The reaction was cooled to room temperature and concentrated under reduced pressure. The residue was purified on an AnaLogix 65-200 g column, eluting with a gradient of 0 to 30% ethyl acetate in heptanes to give 3,3''-((ethane-1,2-diylbis(methylazanediyl))bis(methylene))bis(2',3',4',5',6'-pentafluoro-5-methyl-[1,1'-biphenyl]-2-ol) (12) (5.0 g, 51% yield) as a white solid.

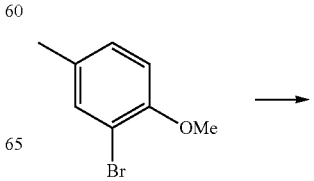

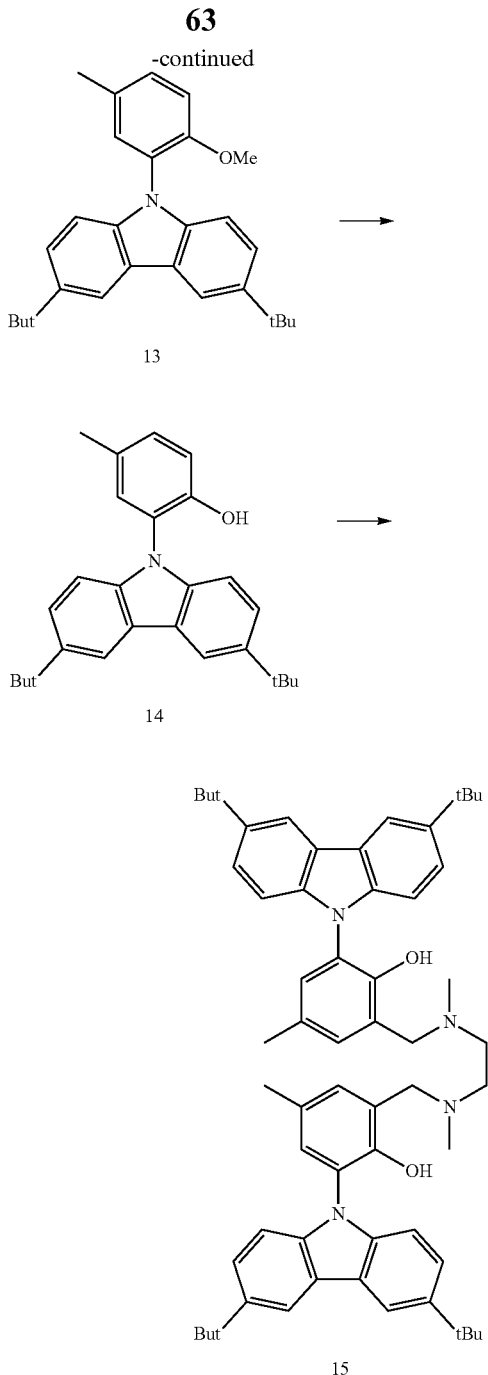

9-(2-Methoxy-5-methylphenyl)-9H-(3,6-di-tert-butyl-carbazole) (13)

Racemic trans-1,2-diaminocyclohexane (5.12 mL, 42.6 mmol, 0.2 equiv), potassium phosphate tribasic (79.2 g, 372 mmol, 1.75 equiv) and copper(I) iodide (2.03 g, 10.7 mmol, 0.05 equiv) were added at room temperature to a mixture of 2-bromo-4-methylanisole (42.9 g, 213 mmol, 1.0 equiv) and 3,6-di-tert-butyl-9H-carbazole (65.5 g, 234 mmol, 1.1 equiv) in 1,4-dioxane (1000 mL), which was degassed with a stream of nitrogen for 15 minutes. The mixture was refluxed for four days, at which point LCMS indicated 40% conversion to product. After cooling to room temperature, the mixture was diluted with water (500 mL) and ethyl acetate (1000 mL). The layers were separated and the aqueous layer was extracted with ethyl acetate (3×500 mL). The combined organic layers were washed with saturated brine (500 mL), dried over sodium sulfate, filtered, and concentrated under reduced pressure. The crude product was triturated with a 1:1 mixture of methyl tert-butyl ether and heptanes (500 mL) to give pure product. The mother liquor was purified on a BIOTAGE-75L column, eluting with a gradient of 5 to 10% ethyl acetate in heptanes to give additional pure product. The two batches were combined to give compound 13 (34.5 g, 37% yield) as an off-white solid.

2-(9H-(3,6-di-tert-butyl-Carbazol-9-yl))-4-methyl-phenol (14)

1.0M boron tribromide in dichloromethane (173 mL, 173 mmol, 2.0 equiv) was added drop wise at −70° C. to a solution of compound 13 (34.5 g, 86.5 mmol, 1.0 equiv) in anhydrous dichloromethane (700 mL). The mixture was allowed to warm to room temperature at which point LCMS indicated that the reaction was complete. The reaction was quenched by the slow addition of ice-water (200 mL) and the layers were separated. The aqueous layer was extracted with dichloromethane (2×200 mL), and the combined organic layers were washed with saturated brine (200 mL), dried over sodium sulfate, filtered, and concentrated under reduced pressure. The residue was purified over silica gel (500 g) with dry-loading, eluting with a gradient of 0 to 20% ethyl acetate in heptanes to give the desired product (31 g, 85% purity) as an off-white solid. This material was triturated with 5% ethyl acetate in heptanes (100 mL) to give compound 14 (18.9 g) as a white solid.

6,6-((Ethane-1,2-diylbis(methylazanediyl))bis(methylene))bis(2-(9H-(3,6-di-tert-butyl-carbazol-9-yl))-4-methylphenol) (15)

compound 14 (2.07 g; 5.37 mmol), N,N'-dimethylethylenediamine (0.144 mL, 0.118 g, 1.63 mmol) and paraformaldehyde (0.161 g, 5.36 mmol) were dissolved in 40 mL of ethanol and refluxed overnight. The reaction mixture was allowed to cool to room temperature. The volatiles were removed under vacuum to give a pale yellow solid. Flash chromatography using a gradient of 40-100% dichloromethane/hexanes yielded compound 15 (0.95 g) as an off-white solid (40% yield).

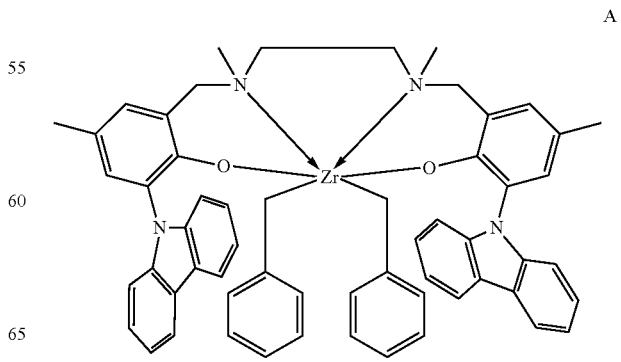

A

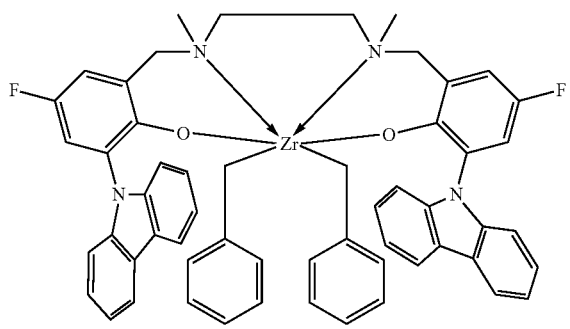

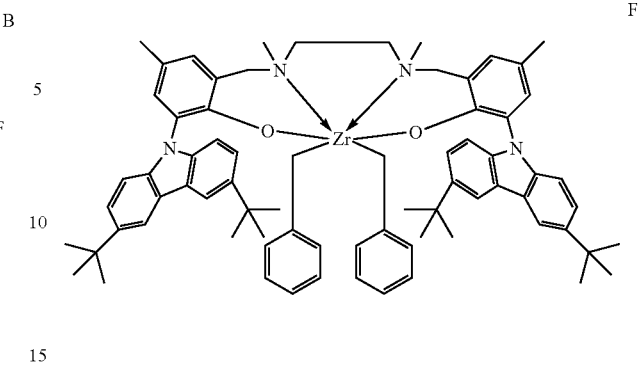

[6,6'-((Ethane-1,2-diylbis(methylazanediyl))bis(methylene))bis(2-(9H-carbazol-9-yl)-4-methylphenol)]zirconium(IV)dibenzyl (A)

Under a nitrogen atmosphere, a toluene solution (5 mL) of 3 (107 mg, 0.17 mmol) was added to a yellow toluene solution (5 mL) of ZrBn₄ (77 mg, 0.17 mmol), forming a deep yellow solution. After stirring at room temperature for 15 minutes, the solvent was removed to give a yellow sticky solid. The product was washed with pentane and dried under vacuum to give compound A as a yellow solid (yield 135 mg, 88%). Compounds B through F were made in a similar manner from compounds 6, 9, 3, 13, or 15 and the corresponding Group IV tetrabenzyl precursors.

All reactions were performed under an inert nitrogen atmosphere. Solvents were anhydrous grade from Sigma Aldrich which were sparged with nitrogen and stored over alumina beads (activated at 300° C.) before use. Deuterated solvents were obtained from Cambridge Isotope Laboratories (Andover, Mass.) and dried over 3 Å molecular sieves. All other reagents were obtained from Sigma Aldrich (St. Louis, Mo.) and used as received, unless otherwise noted. All $^1$H NMR data were collected on a Broker AVANCE III 400 MHz spectrometer running Topspin™ 3.0 software at room temperature (approx. 23° C.). Tetrachloroethane-d₂ was used as a solvent (chemical shift of 5.98 ppm was used as a reference) for all materials.

Methyl Alumoxane Supported on Silica (SMAO):

In a celstir flask a 13.8 gram amount of Grace 948 silica that was previously calcined at 600° C. was slurried in 110 mL of toluene and heated to 80° C. MAO (30% by weight in toluene) (23.5152 g solution) was slowly added to the slurry. The slurry was stirred for 1 hr before being filtered and washed 4 times with 50 mL of toluene and dried under vacuum. 19.9883 g of a white solid was collected.

Representative Sample for Slurry SMAO Preparation:

Catalyst B (25.2 mg) was dissolved in 5 mL of toluene. This solution was added to a slurry of SMAO (0.822 g) in 25 mL of toluene. After 1 hr the slurry was filtered leaving a pale yellow solid that is washed with toluene and dried under vacuum. Collected 0.764 g of a pale yellow solid.

| Slurry SMAO catalyst preparations | | | |
|---|---|---|---|
| Supported catalyst | Catalyst (mg) | SMAO (g) | Yield (g) |
| A/SMAO | 30.8 | 0.8832 | 0.8526 |
| B/SMAO | 25.2 | 0.822 | 0.764 |

-continued

| Slurry SMAO catalyst preparations | | | |
|---|---|---|---|
| Supported catalyst | Catalyst (mg) | SMAO (g) | Yield (g) |
| C/SMAO | 27.3 | 0.7619 | 0.6932 |
| E/SMAO | 30.0 | 0.8066 | 0.7375 |

Representative Sample for Incipient Wetness MAO-Silica Preparation

In a 20 mL vial, MAO (30% by weight in toluene) (0.5984 g solution) was allowed to stir for 15 min with an additional 1 mL of toluene. Catalyst C (28.4 mg) was then added as a solid and allowed to stir for an additional 15 min. To this was added 948 Silica (0.7932 g) previously calcined at 600° C. The mixture was stirred via spatula for 10 min to reach a uniform pale yellow color. The solid was placed under vacuum. Collected 0.9539 g of a pale yellow solid.

| Supported catalyst | Catalyst (mg) | MAO** (g) | 948 Silica (g) | Yield (g) |
|---|---|---|---|---|
| C/I* | 28.4 | 0.5984 | 0.7932 | 0.9539 |
| A/I* | 25.7 | 0.6085 | 0.6909 | 0.8535 |
| F/I* | 24.7 | 0.5056 | 0.4095 | 0.5537 |

*I—incipient wetness
**solution (3×5 mL), and dried under reduced pressure to afford a white powder (1.26 g).

Preparation of Catalyst B/SMAO-2

A toluene (5 mL) solution of catalyst compound B (0.0482 g, 0.0514 mmol) was combined with SMAO-2 (1.29 g, 6.16 mmol Al). The mixture was swirled. After 5 minutes the solids were collected on a glass frit, washed with toluene (3×5 mL), and dried under reduced pressure to afford a pale yellow powder (1.33 g).

General Procedure for Ethylene Polymerizations

Semi-continuous ethylene polymerizations were performed in a stirred 1 L autoclave reactor. Details of polymerization conditions and the products formed are described in Table 1. All solvents, reactants, and gases were purified by passing through multiple columns containing 3 angstrom molecular sieves and oxygen scavenger. Typically, isohexane (500 mL) and scavenger (tri-n-octylaluminum, 0.10 mmol) was added to the reactor and the mixture was heated to the desired temperature. The reactor was then pressurized with ethylene to a pressure 137.9 kPa to 241.3 kPa (20-35 psi) below the final reaction pressure. Once the reactor had equilibrated a slurry of the catalyst in toluene (2 mL) was pushed in with ethylene gas at the final reaction pressure. Polymerization was carried out for a set amount of time and then the reactor was cooled, depressurized, and opened. The residual volatiles in the product were removed under a stream of nitrogen, followed by heating the sample in a vacuum oven at 60° C.

TABLE 1

Summary of polymerization conditions and data

| Run | Complex (nmol) | Catalyst/Activator | $C_2$ (kPa (psi)) | T (° C.) | Time (min) | Yield (g) | A (g/mmol) | Activity (g pol/g⁻cat.*hr) | NMR % vinyl | NMR % internal vinylidene | NMR Mn |
|---|---|---|---|---|---|---|---|---|---|---|---|
| 1 | 8000 | D/SMAO-2 | 1380 (200) | 65 | 20 | 36.9 | 4613 | — | 90.1 | 9.9 | 22,753 |
| 2 | 8000 | D/SMAO-2 | 1380 (200) | 65 | 60 | 94.6 | 11821 | — | 100.0. | 0.0 | 25,690 |
| 3 | 6000 | D/SMAO-2 | 15200 (2200) | 80 | 60 | 126.9 | 21150 | — | 100.0. | 0.0 | 23,476 |
| 4 | 8000 | D/SMAO-2 | 15200 (2200) | 80 | 90 | 179.1 | 22391 | — | 100.0. | 0.0 | 25,161 |
| 5 | 418 | D/SMAO-2 | 15200 (2200) | 65 | 30 | 40.5 | 96770 | — | 83.2 | 16.8 | 3,442 |
| 6 | — | B/SMAO-2 | 1380 (200) | 80 | — | — | — | — | — | — | — |
| 7 | — | F/I | 903 (131) | 85 | 60 | 75.5 | 35322 | 1066 | 91.7 | 8.3 | — |
| 8 | — | F/I | 924 (134) | 85 | 15 | 15.5 | 53852 | 1661 | 91.7 | 7.7 | — |
| 9 | — | C/SMAO | 917 (133) | 85 | 60 | 145.4 | 53874 | 2083 | 92.5 | 4.7 | — |
| 10 | — | B/SMAO | 896 (130) | 85 | 60 | 36.9 | 20595 | 650 | 92.0 | 7.0 | — |
| 11 | — | B/SMAO | 1410 (205) | 80 | 60 | 56.8 | 32529 | 1030 | 89.1 | 10.0 | — |
| 12 | — | B/SMAO | 676 (98) | 80 | 60 | 31.9 | 19195 | 607 | — | — | — |
| 13 | — | E/SMAO | 924 (134) | 85 | 30 | 1.04 | 561 | 43.3 | — | — | — |
| 14 | — | E/SMAO | 945 (137) | 85 | 30 | 1.22 | 341 | 26.2 | — | — | — |
| 15 | — | A/SMAO | 951 (138) | 85 | 30 | 158.6 | 77096 | 2966 | — | — | — |

Preparation of Supported Methylalumoxane (SMAO-2)

Toluene (80 ml) and MAO (Albemarle, 30 wt % in toluene, 37.49 g, 194 mmol Al) were combined. Then Davidson 948 silica (30 g), which had been calcined at 600° C., was added. The mixture was heated to 100° C. and the mixture was swirled occasionally. After 3 hours the mixture was cooled to ambient temperature and the solids were collected on a glass fritted disk. The product was dried under reduced pressure for 22 hours to afford a free-flowing white solid (40.5 g).

Preparation of Catalyst D/SMAO-2

A toluene (5 mL) solution of catalyst compound D (0.0500 g, 0.0491 mmol) was combined with SMAO-2 (1.23 g, 5.89 mmol Al). The mixture was swirled. After 5 minutes the solids were collected on a glass frit, washed with toluene These data show the catalyst compounds, catalyst systems, and polymerization processes disclosed herein can produce polymers having improved properties, such as high polymer melting point, high polymer molecular weights, an increased conversion and/or comonomer incorporation, which may further include a significant amount of vinyl termination.

The catalysts, in an embodiment according to the invention, provide improvement in catalyst activity, produce polymers with improved properties or both. Crystallographic techniques indicate that the appended ring system or systems (e.g., the carbazole ring systems) are oriented transversely, e.g., perpendicular, to the phenol rings. These catalysts have a structure to provide a broad corridor for the polymeryl moiety to reside and for the monomer to insert during the polymerization process. As such, catalysts according to one embodiment of the instant disclosure provide for an ability to control one or more characteristics of polymerization, tacticity, comonomer insertion, and the like.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments according to the invention, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

What is claimed is:

1. A polyolefin, comprising:
   i) at least 50 mole % ethylene;
   ii) a ratio of saturated chain ends to allyl chain ends of greater than 1:1;
   iii) a ratio of allylic vinyl groups per molecule as determined by $^{13}C$ NMR of at least 50%;
   iv) an Mw of 5,000 to 1,000,000 g/mol as determined by $^{1}H$ NMR;
   v) an allylic vinyl content of at least 50 mole %, based upon total number of moles of unsaturation, as determined by $^{1}H$ NMR; and
   vi) a ratio of long chain branching, of at least 7 carbons, of greater than 0.5 per 1000 carbon atoms, as determined according to $^{13}C$ NMR.

2. The polyolefin of claim 1, wherein the polyolefin is produced by a process comprising:
   contacting one or more olefins with a catalyst system at a temperature, a pressure, and for a period of time sufficient to produce a polyolefin, the catalyst system comprising an activator and a catalyst compound disposed on a support; and
   the catalyst compound is according to Formula I, Formula II, Formula III, or a combination thereof:
   Formula I being represented by:

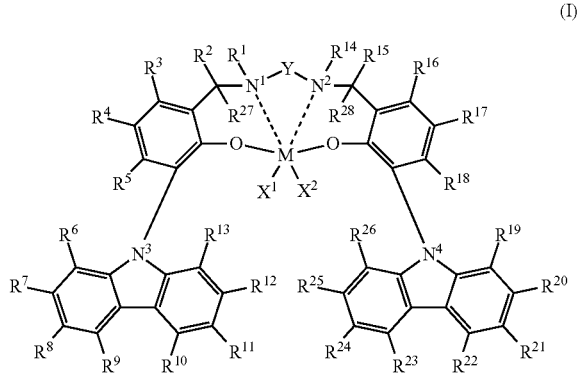

(I)

wherein each solid line represents a covalent bond and each dashed line represents a bond having varying degrees of covalency and a varying degree of coordination;

M is a Group 4, 5 or 6 transition metal;

$N^1$, $N^2$, $N^3$ and $N^4$ are nitrogen;

O is oxygen;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, a hydrogen, a $C_1$-$C_{40}$ hydrocarbyl radical, a functional group comprising elements from Groups 13-17 of the periodic table of the elements, or two or more of $R^1$ to $R^{28}$ may independently join together to form a $C_4$ to $C_{62}$ cyclic or polycyclic ring structure, or a combination thereof; and Y is a divalent $C_1$ to $C_{20}$ hydrocarbyl;

Formula II being represented by:

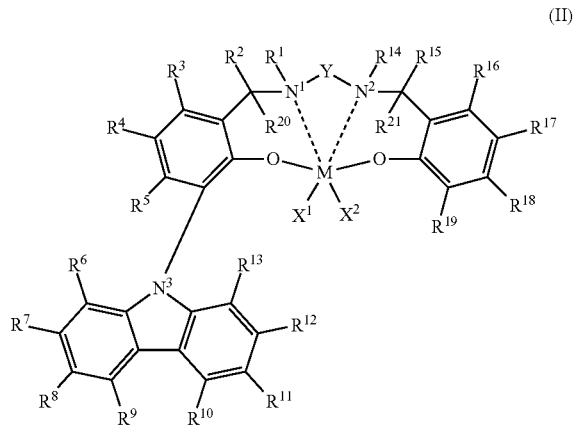

(II)

wherein each solid line represents a covalent bond and each dashed line represents a bond having varying degrees of covalency and a varying degree of coordination;

M is a Group 4, 5 or 6 transition metal;

$N^1$, $N^2$ and $N^3$ are nitrogen;

O is oxygen;

each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, a hydrogen, a $C_1$-$C_{40}$ hydrocarbyl radical, a functional group comprising elements from Group 13-17 of the periodic table of the elements, or two or more of $R^1$ to $R^{21}$ may independently join together to form a $C_4$ to $C_{62}$ cyclic or polycyclic ring structure, or a combination thereof; subject to the proviso that $R^{19}$ is not a carbazole or a substituted carbazole radical, and Y is a divalent $C_1$ to $C_{20}$ hydrocarbyl radical;

Formula III being represented by:

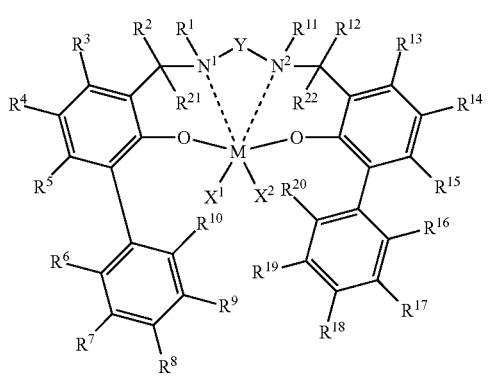

(III)

wherein each solid line represents a covalent bond and each dashed line represents a bond having varying degrees of covalency and a varying degree of coordination;

M is a Group 4, 5 or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13-17 of the periodic table of the elements, or $X^1$ and $X^2$ join together to form a $C_4$ to $C_{62}$ cyclic or polycyclic ring structure;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{22}$ is, independently, a hydrogen, a $C_1$-$C_{40}$ hydrocarbyl radical, a functional group comprising elements from Group 13-17 of the periodic table of the elements, or two or more of $R^1$ to $R^{22}$ may independently join together to form a $C_4$ to $C_{62}$ cyclic or polycyclic ring structure, or a combination thereof;
at least one of $R^6$, $R^7$, $R^8$, $R^9$, $R^{10}$, $R^{16}$, $R^{17}$, $R^{18}$, $R^{19}$, or $R^{20}$ comprise fluorine; and
Y is a divalent $C_1$ to $C_{20}$ hydrocarbyl radical.

3. The polyolefin of claim 1, comprising at least 99.9 mole percent ethylene.

4. The polyolefin of claim 1, wherein the ratio of allylic vinyl groups per molecule is at least 80%.

5. The polyolefin of claim 1, further comprising propylene.

6. The polyolefin of claim 1, comprising an allylic vinyl content of at least 80 mole %, based upon total number of moles of unsaturated groups.

7. The polyolefin of claim 1, comprising a number average molecular weight ($M_e$) from 1250 g/mol into 100,000 g/mol.

8. The polyolefin of claim 1, comprising a ratio of long chain branching, of at least 7 carbons, of greater than 1 per 1000 carbon atoms, as determined according to $^{13}$C NMR.

9. A polyolefin, comprising:
i) at least 50 mole % ethylene;
ii) a ratio of saturated chain ends to allyl chain ends of greater than 1:1 and a ratio of methyl chain ends to vinyl chain ends from 1:1 to 4:1;
iii) a ratio of allylic vinyl groups per molecule as determined by $^{13}$C NMR of at least 50%;
iv) an Mw of 5,000 to 1,000,000 g/mol as determined by $^1$H NMR;
v) an allylic vinyl content of at least 50 mole %, based upon total number of moles of unsaturation, as determined by $^1$H NMR; and
vi) a ratio of long chain branching, of at least 7 carbons, of greater than 0.5 per 1000 carbon atoms, as determined according to $^{13}$C NMR.

10. The polyolefin of claim 1, comprising a ratio of methyl chain ends to vinyl chain ends from 1:1 to 3:1.

11. The polyolefin of claim 1, wherein at least 80 wt % of the polyolefin has one allylic vinyl group per molecule.

12. The polyolefin of claim 1, wherein at least 95 wt % of the polyolefin has one allylic vinyl group per molecule.

13. The polyolefin of claim 1, comprising a weight average molecular weight ($M_w$) of 50,000 to 500,000 g/mol.

14. The polyolefin of claim 1, comprising an Mw/Mn of from greater than 1 to 4.

15. The polyolefin of claim 2, wherein the catalyst compound is according to Formula I.

16. The polyolefin of claim 2, wherein the catalyst compound is according to Formula II.

17. The polyolefin of claim 2, wherein the catalyst compound is according to Formula III.

18. A polyolefin, comprising:
i) at least 95 mole % ethylene;
ii) a ratio of saturated chain ends to allylic vinyl chain ends of 1:1 to 3:1;
iii) a ratio of allylic vinyl groups per molecule as determined by $^{13}$C NMR of at least 50%;
iv) an Mw of 5,000 to 1,000,000 g/mol as determined by $^1$H NMR;
v) at least 80 mole % allylic vinyl chain ends, based upon total moles of unsaturation, as determined by $^1$H NMR;
vi) an Mw/Mn of from greater than 1 to 4;
vii) a ratio of long chain branching, of at least 7 carbons, of greater than 0.5 per 1000 carbon atoms, as determined according to $^{13}$C NMR.

19. The polyolefin of claim 18, wherein the polyolefin is produced by a process comprising contacting one or more olefins with a catalyst system at a temperature, a pressure, and for a period of time sufficient to produce the polyolefin, wherein the catalyst system comprises an activator and a salan catalyst precursor compound disposed on a support.

20. The polyolefin of claim 18, comprising at least 99.9 mole percent ethylene, a ratio of allylic vinyl groups per molecule as determined by $^{13}$C NMR of at least 0.9, a ratio of long chain branching of at least 7 carbons of greater than 1 long chain branch per 1000 carbon atoms, as determined according to $^{13}$C NMR, and an Mw from 25,000 to 750,000.

* * * * *